US011843776B2

(12) United States Patent
Rapaka et al.

(10) Patent No.: US 11,843,776 B2
(45) Date of Patent: Dec. 12, 2023

(54) VIDEO ENCODER WITH QUANTIZATION CONTROL

(71) Applicant: Apple Inc., Cupertino, CA (US)

(72) Inventors: Krishnakanth Rapaka, San Jose, CA (US); Munehiro Nakazato, San Jose, CA (US); Jiandong Shen, Cupertino, CA (US); Ganesh G. Yadav, Fremont, CA (US); Sorin Constantin Cismas, Saratoga, CA (US); Jim C. Chou, San Jose, CA (US); Hao Pan, Sunnyvale, CA (US)

(73) Assignee: APPLE INC.

( * ) Notice: Subject to any disclaimer, the term of this patent is extended or adjusted under 35 U.S.C. 154(b) by 64 days.

(21) Appl. No.: 17/843,160

(22) Filed: Jun. 17, 2022

(65) Prior Publication Data

US 2022/0329805 A1 Oct. 13, 2022

Related U.S. Application Data

(63) Continuation of application No. 16/844,168, filed on Apr. 9, 2020, now Pat. No. 11,399,180.

(60) Provisional application No. 62/831,259, filed on Apr. 9, 2019.

(51) Int. Cl.

*H04N 19/124* (2014.01)
*H04N 19/60* (2014.01)
*H04N 19/126* (2014.01)

(52) U.S. Cl.

CPC ......... *H04N 19/124* (2014.11); *H04N 19/126* (2014.11); *H04N 19/60* (2014.11)

(58) Field of Classification Search

CPC .................... H04N 19/124–126; H04N 19/60
See application file for complete search history.

(56) References Cited

U.S. PATENT DOCUMENTS 5,761,398 A * 6/1998 Legall .................. H04N 19/159 375/E7.176
10,425,642 B1 * 9/2019 Wu ...................... H04N 19/126
2003/0063666 A1 * 4/2003 Sugiyama ............ H04N 19/174 375/E7.218
2009/0010559 A1 * 1/2009 Inagaki .................. H04N 19/18 382/253
2009/0052526 A1 * 2/2009 Fukuda ................ H04N 19/105 375/240.03
2010/0091842 A1 * 4/2010 Ikeda .................. H04N 19/176 375/240.03

(Continued)

FOREIGN PATENT DOCUMENTS

CA 2105209 A * 3/1995 ........... H04N 19/107
CN 101543076 A * 9/2009 ........... H04N 19/117

(Continued)

*Primary Examiner* — Robert J Hance
(74) *Attorney, Agent, or Firm* — Fernando & Partners, LLP

(57) ABSTRACT

In one implementation, a method of encoding an image is performed at a device including one or more processors and non-transitory memory. The method includes determining a category of a spatial portion of an image based on a relation between a plurality of thresholds associated with a plurality of quantization scaling parameters and a bit rate of the spatial portion of the image at the plurality of quantization scaling parameters. The method includes quantizing the spatial portion of the image based on the categorization.

20 Claims, 13 Drawing Sheets

(56) References Cited

U.S. PATENT DOCUMENTS

| | | | | |
|---|---|---|---|---|
| 2010/0124279 | A1* | 5/2010 | Reddy | H04N 19/149 375/E7.011 |
| 2010/0238997 | A1* | 9/2010 | Yang | H04N 19/105 375/240.03 |
| 2010/0316119 | A1* | 12/2010 | Mathew | H04N 19/124 375/240.03 |
| 2012/0257672 | A1* | 10/2012 | Yang | H04N 19/126 375/240.03 |
| 2013/0051457 | A1* | 2/2013 | Joshi | H04N 19/61 375/240.03 |
| 2018/0084253 | A1* | 3/2018 | Thiagarajan | H04N 19/625 |

FOREIGN PATENT DOCUMENTS

| | | | | |
|---|---|---|---|---|
| CN | 101543076 | A | 9/2009 | |
| DE | 4034535 | A1 * | 5/1991 | |
| DE | 4034535 | A1 | 5/1991 | |
| GB | 2306832 | A * | 5/1997 | H04N 19/126 |
| JP | 3788823 | B2 * | 6/2006 | G06T 3/40 |
| JP | 3788823 | B2 | 6/2006 | |
| WO | WO-2008077119 | A2 * | 6/2008 | H04N 19/107 |

* cited by examiner

VIDEO ENCODER WITH QUANTIZATION CONTROL

CROSS-REFERENCE TO RELATED APPLICATIONS

This application is a continuation of U.S. patent application Ser. No. 16/844,168, filed on Apr. 9, 2020, which claims priority to U.S. Provisional Patent App. No. 62/831,259, filed on Apr. 9, 2019, which are both hereby incorporated by reference in their entireties.

TECHNICAL FIELD

The present disclosure generally relates to video encoding, and in particular, to systems, methods, and devices for encoding a video stream with quantization control.

BACKGROUND

In various video encoders, an image of a frame of a video stream, is transformed, quantized, and run-length encoded. However, the same quantization may not be appropriate for all images, or portions thereof. Accordingly, in various implementations described herein, different quantization is applied to different images, slices, blocks, and/or frequencies according to controllable settings and/or characteristics of the encoding environment, such as the image itself or a channel over which the image is transmitted.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
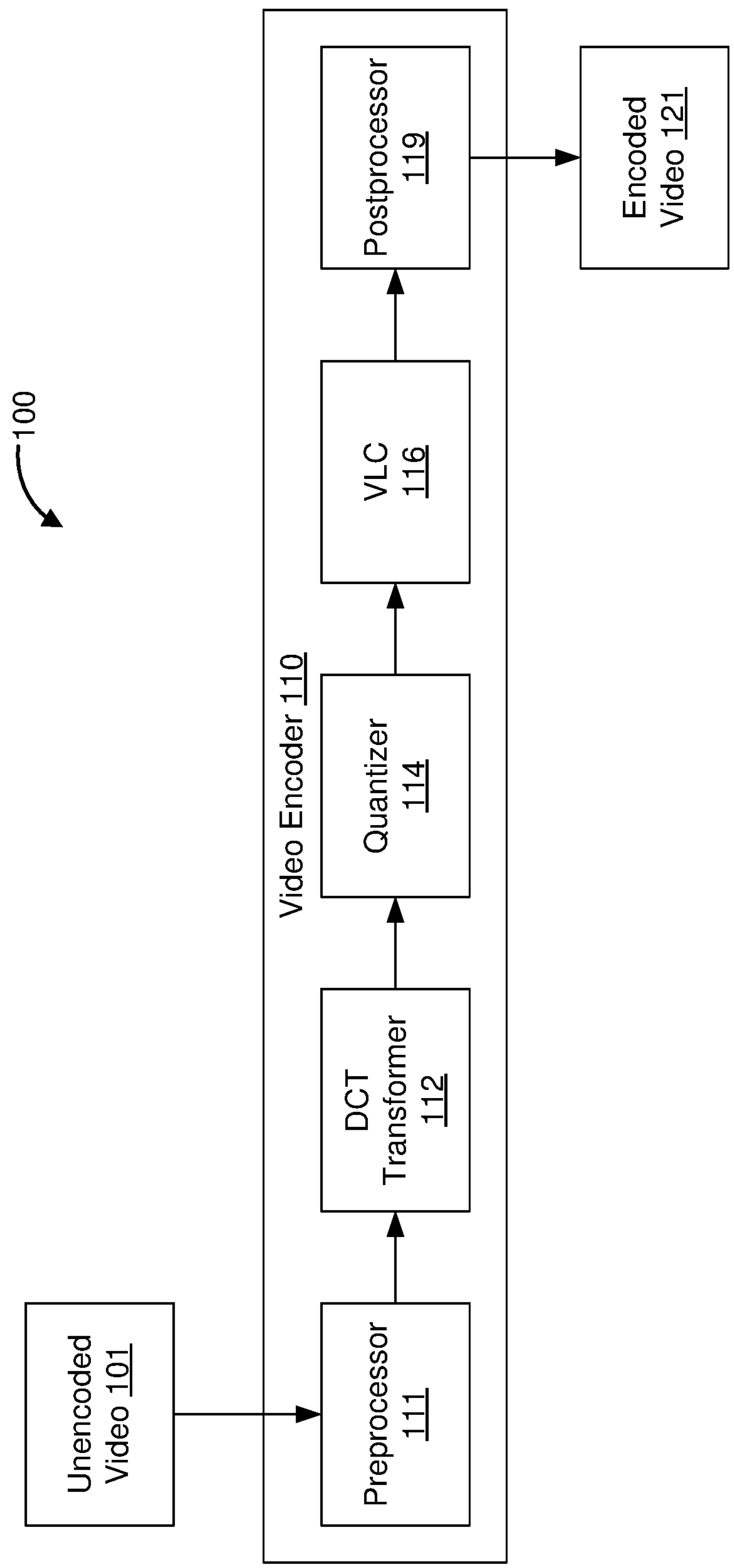
FIG. 1 illustrates a video coding environment including a video encoder.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for encoding an image (e.g., an image of video stream). In various implementations, a first method is performed at a device including one or more processors and non-transitory memory. The method includes receiving a first image comprising a plurality of pixels having a respective plurality of pixel locations and a respective plurality of pixel values. The method includes applying a frequency transform to a first spatial portion of the first image to generate a plurality of first frequency coefficients respectively associated with a plurality of spatial frequencies and applying the frequency transform to a second spatial portion of the first image to generate a plurality of second frequency coefficients respectively associated with the plurality of spatial frequencies. The method includes obtaining a first quantization matrix including, for each of the plurality of spatial frequencies, a respective first quantization parameter, wherein a first quantization parameter associated with a first spatial frequency of the plurality of spatial frequencies has a first ratio with a first quantization parameter associated with a second spatial frequency of the plurality of spatial frequencies, and obtaining a second quantization matrix including, for each of the plurality of spatial frequencies, a respective second quantization parameter, wherein a second quantization parameter associated with the first spatial frequency has a second ratio, different than the first ratio, with a second quantization parameter associated with the second spatial frequency. The method includes quantizing the plurality of first frequency coefficients according to the first quantization matrix to generate a plurality of first quantized frequency coefficients and quantizing the plurality of second frequency coefficients according to the second quantization matrix to generate a plurality of second quantized frequency coefficients. The method includes transmitting the plurality of first quantized frequency coefficients and the plurality of second quantized frequency coefficients.

In various implementations, a second method is performed at a device including one or more processors and non-transitory memory. The method includes receiving an image comprising a plurality of pixels having a respective plurality of pixel locations and a respective plurality of pixel values. The method includes applying a frequency transform to a spatial portion of the image to generate a plurality of frequency coefficients respectively associated with a plurality of spatial frequencies. The method includes obtaining a quantization matrix including, for each of the plurality of spatial frequencies, a respective quantization parameter, wherein the quantization matrix is obtained based on a signal-to-noise ratio of the spatial portion. The method includes quantizing the plurality of frequency coefficients according to the quantization matrix to generate a plurality of quantized frequency coefficients. The method includes transmitting the plurality of quantized frequency coefficients.

In various implementations, a third method is performed at a device including one or more processors and non-transitory memory. The method includes receiving an image comprising a plurality of pixels having a respective plurality of pixel locations and a respective plurality of pixel values. The method includes applying a frequency transform to a spatial portion of the image to generate a plurality of frequency coefficients respectively associated with a plurality of spatial frequencies. The method includes obtaining a quantization matrix including, for each of the plurality of spatial frequencies, a respective quantization parameter and obtaining a quantization spreading parameter defining a plurality of thresholds for a plurality of quantization scaling parameters. The method includes determining a category of the spatial portion of the image based on a relation between the plurality of thresholds and a bit rate of the spatial portion of the image at the plurality of quantization scaling parameters and determining a quantization scaling parameter for the spatial portion of the image based the category. The method includes quantizing the plurality of frequency coefficients according to the quantization matrix and the quantization scaling parameter for the spatial portion of the image to generate a plurality of quantized frequency coefficients. The method includes transmitting the plurality of quantized frequency coefficients.

In various implementations, a fourth method is performed at a device including one or more processors and non-transitory memory. The method includes receiving an image comprising a plurality of pixels having respective plurality of pixel locations and a respective plurality of pixel values. The method includes applying a frequency transform to a spatial portion of the image to generate a plurality of frequency coefficients respectively associated with a plurality of spatial frequencies. The method includes obtaining a quantization matrix including, for each of the plurality of spatial frequencies, a respective quantization parameter. The method includes determining a category of the spatial portion of the image based on a relation between a plurality of thresholds associated with a plurality of quantization scaling parameters and a bit rate of the spatial portion of the image at the plurality of quantization scaling parameters. The method includes determining a quantization scaling parameter for the spatial portion of the image based the category, wherein the quantization scaling parameter for the spatial portion of the image is between a low quantization scaling parameter of the category and a high quantization scaling parameter of the category. The method includes quantizing the plurality of frequency coefficients according to the quantization matrix and the quantization scaling parameter for the spatial portion of the image to generate a plurality of quantized frequency coefficients. The method includes transmitting the plurality of quantized frequency coefficients.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As noted above, some video encoding algorithms include a quantization step in which frequency coefficients of a transformed image are quantized. The same quantization may not be appropriate for all circumstances. Accordingly, in various implementations described herein, different quantization is applied to different images, slices, blocks, and/or spatial frequencies according to controllable settings and/or characteristics of the encoding environment, such as the image itself and/or a channel over which the image is transmitted.

FIG. 1 illustrates a video coding environment 100 including a video encoder 110. The video encoder 110 receives unencoded video 101 and produces encoded video 121 based on the unencoded video 101.

The video encoder 110 includes a preprocessor 111 that decomposes the unencoded video 101 into unencoded blocks. In various implementations, decomposing the unencoded video includes performing a temporal decomposition of the unencoded video 101. In various implementations, the unencoded video 101 includes a sequence of frames, each frame including an unencoded image. In various implementations, the unencoded image includes a plurality of pixels arranged in matrix. For example, in various implementations, the unencoded image includes a grayscale image. As another example, in various implementations, the unencoded image includes a RAW image.

In various implementations, decomposing the unencoded video 101 into unencoded blocks includes performing a channel decomposition of the unencoded video 101. In various implementations, the preprocessor 111 decomposes the unencoded image into an image including multiple channels, each channel including a plurality of pixels arranged in a matrix. For example, in various implementations, the preprocessor 111 converts a RAW image into an RGB image including a red channel, a green channel, and a blue channel. In various implementations, the preprocessor 111 converts a RAW image into a YUV image including a luma channel, a first chroma channel, and a second chroma channel. In converting a RAW image, the preprocessor 111 can apply a demosaic algorithm to generate the color image from incomplete color samples output from an image sensor overlaid with a color filter array (CFA), e.g., a Bayer filter array. In various implementations, the preprocessor 111 extracts metadata (e.g. depth information or transparency [alpha] information) from the unencoded image into a separate channel.

In various implementations, the unencoded image including multiple channels, each channel including a plurality of pixels arranged in a matrix. For example, the unencoded image can include a red channel, a green channel, a blue channel, a luma channel, a first chroma channel, a second chroma channel, a depth information channel, and/or a transparency information channel. For example, in various implementations, the unencoded image is an RGB image including a red channel, a green channel, and a blue channel. As another example, in one implementation, the unencoded image is a YUV image including a luminance channel and two chroma channels. In various implementations, the unencoded image is a YUV444 image in which each pixel of a chroma channel is associated with one pixel of the luminance channel. In various implementations, the unencoded image is a YUV422 image in which each chroma pixel of a chroma channel is associated with a 2×2 block of pixels of the luminance channel (e.g., the chroma channels are downsampled).

Figure 2:
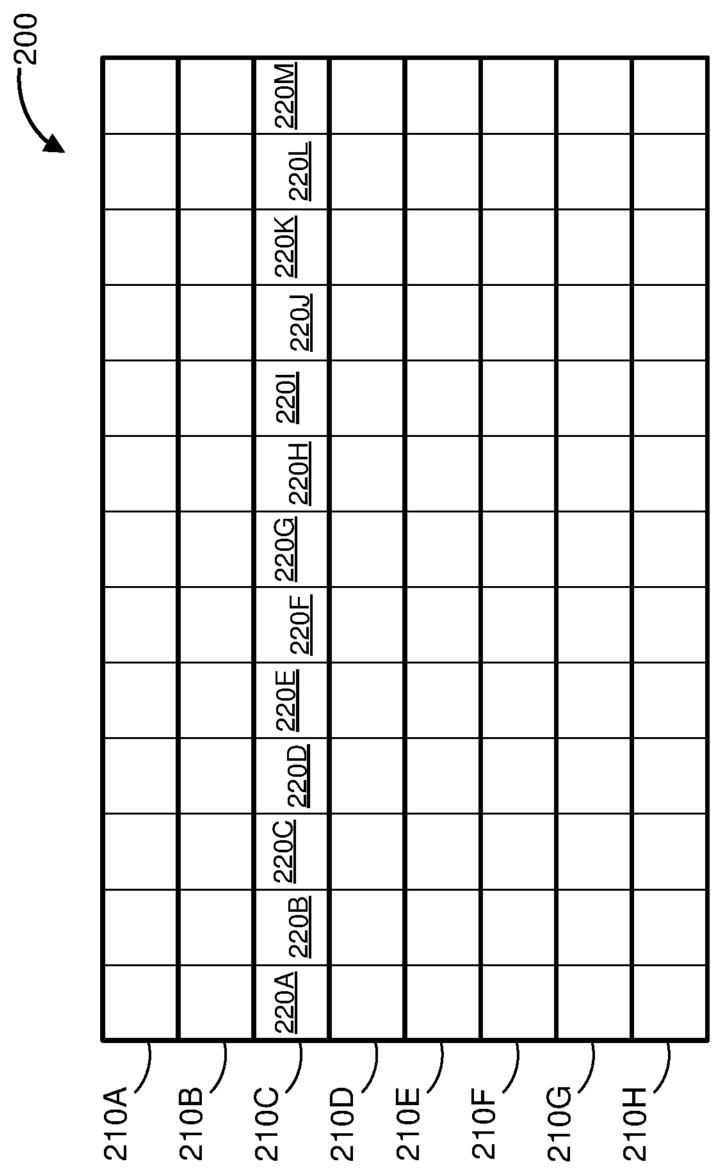
FIG. 2 illustrates a spatial decomposition of an unencoded image.

In various implementations, decomposing the unencoded video 101 into unencoded blocks includes performing a spatial decomposition of the unencoded video 101. FIG. 2 illustrates a spatial decomposition of an unencoded image 200. The unencoded image 200 includes an N×M matrix of pixels, each pixel having a corresponding pixel value and a corresponding pixel location. In various implementations, the pixel values range from 0 to 255. In various implementations, the unencoded image 200 corresponds to an unencoded image as described above. In various implementations, the unencoded image 200 corresponds to a channel of an unencoded image as described above.

In various implementations, the preprocessor 111 decomposes the unencoded image 200 into a plurality of unencoded slices 210A-210H. Each unencoded slice is an n×M matrix of pixels and the unencoded image 200 includes S unencoded slices. Thus, N=S*n. In various implementations, the preprocessor 111 decomposes an unencoded slice 210C into a plurality of unencoded blocks 220A-220M. Each unencoded block is an n×m matrix of pixels and the unencoded slice 210C includes B unencoded blocks. Thus, M=B*m. The unencoded image 200 includes S*B unencoded blocks.

Figure 3:
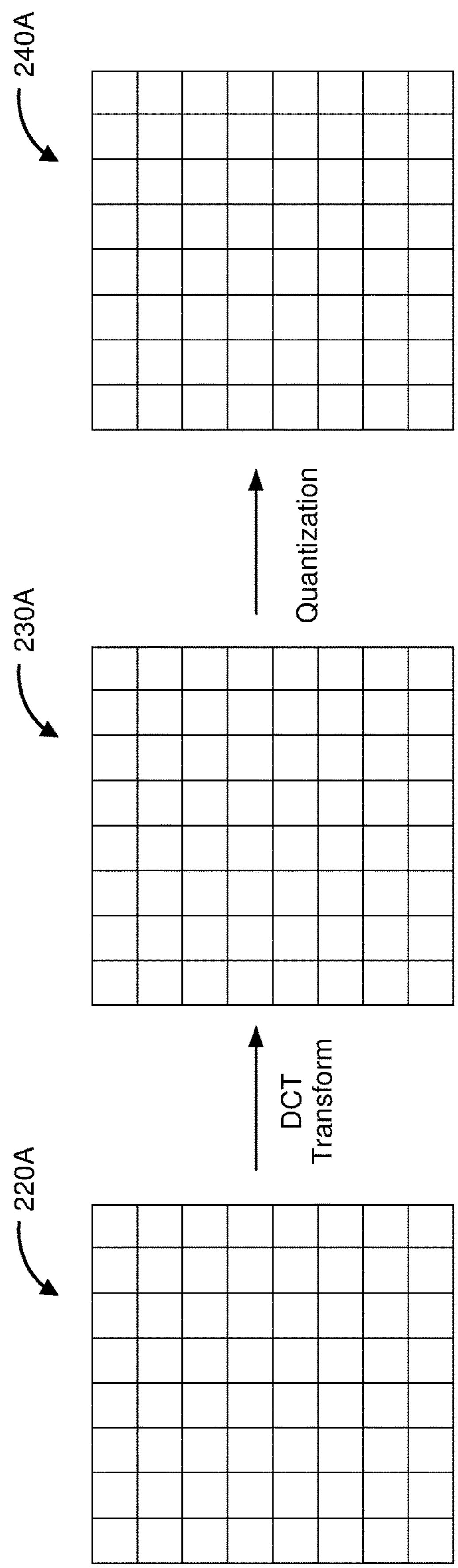
FIG. 3 illustrates an n×m unencoded block, an n×m transformed block, and an n×m quantized block.

Referring again to FIG. 1, the video encoder 110 includes a DCT transformer 112 that receives an unencoded block from the preprocessor 111 and performs a DCT transform (or other frequency transform) on the unencoded block, generating a transformed block. The transformed block includes a plurality of frequency coefficients respectively associated with a plurality of spatial frequencies. In various implementations, an n×m unencoded block is transformed into an n×m transformed block. For example, FIG. 3 illustrates an n×m unencoded block 220A to which a DCT transform is applied to generate an n×m transformed block 230A.

Referring again to FIG. 1, the video encoder 110 includes a quantizer 114 that receives a transformed block from the DCT transformer 112 and quantizes the transformed block to generate a quantized block. The quantized block includes a plurality of quantized frequency coefficients respectively associated with the plurality of spatial frequencies. In various implementations, an n×m transformed block is quantized into an n×m quantized block. For example, FIG. 3 illustrates an n×m transformed block 230A quantized to generate an n×m quantized block 240A.

The quantizer 114 quantizes the transformed block 230A based on a quantization matrix including, for each of the plurality of spatial frequencies, a respective first quantization parameter. In various implementations, the quantizer 114 quantizes the transformed block 230A based on the quantization matrix scaled by a quantization scaling parameter.

In various implementations, the quantizer 114 applies different quantization matrices to different channels of the unencoded image (or, more particularly, to the respective blocks of different channels). In various implementations, the quantizer 114 applies different quantization matrices to different spatial portions of the unencoded image (or, more particularly, to the respective blocks of different spatial portions). For example, in various implementations, the quantizer 114 applies different quantization matrices to different slices of the unencoded image (or, more particularly, to the respective blocks of different slices). As another example, in various implementations, the quantizer 114 applies different quantization matrices to different blocks of the unencoded image.

Figure 4:
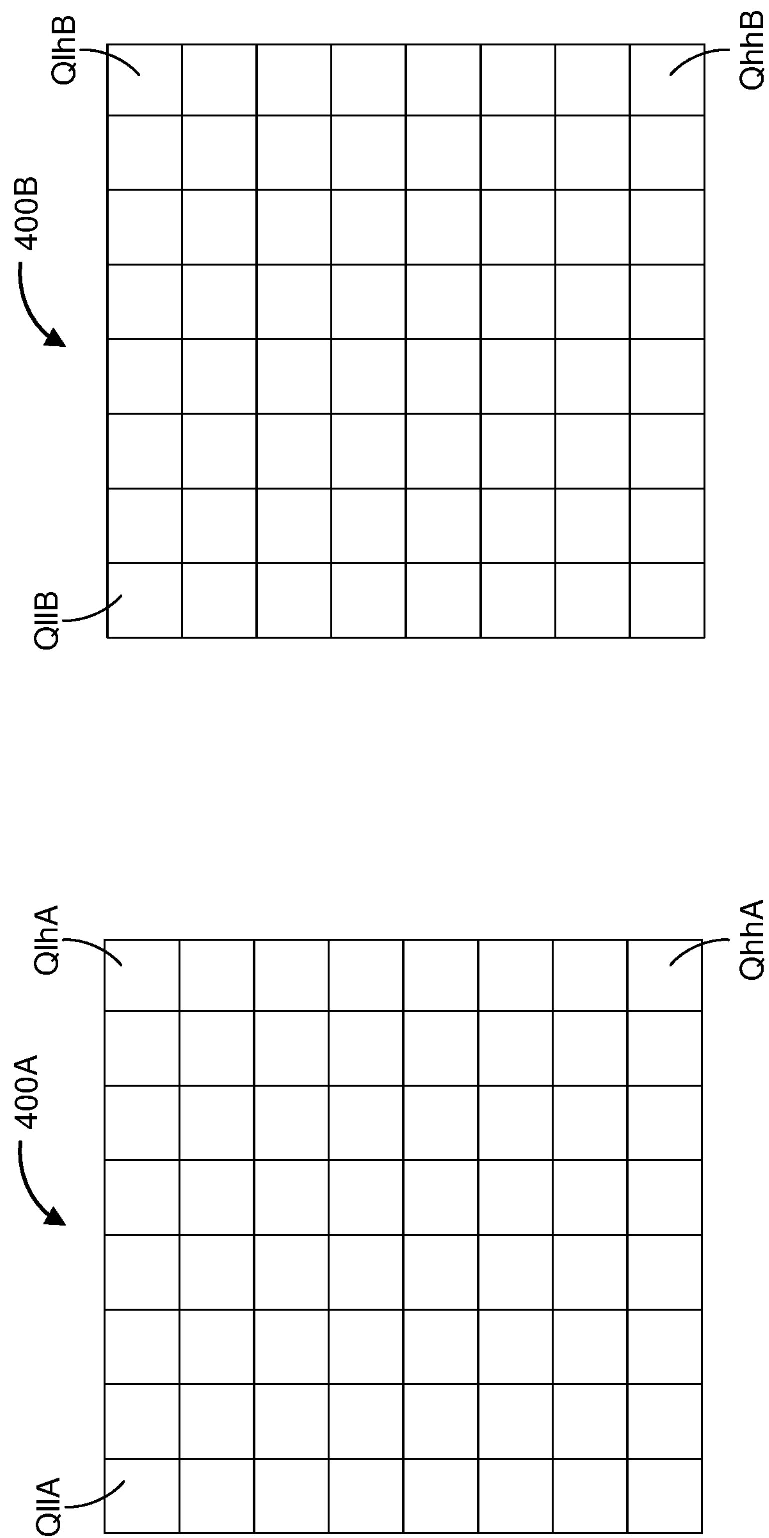
FIG. 4 illustrates two different quantization matrices.

FIG. 4 illustrates two different quantization matrices 400A-400B. The first quantization matrix 400A includes a first value QllA for a first spatial frequency (e.g., a lowest frequency in both the horizontal and vertical dimensions). The second quantization matrix 400B includes a second value QllB for the first spatial frequency. In various implementations, the first value is different than the second value.

The first quantization matrix 400A includes a third value QlhA for a second spatial frequency (e.g., a highest frequency in the horizontal dimension and a lowest frequency in the vertical dimension). The second quantization matrix 400B includes a fourth value QlhB for the second spatial frequency. In various implementations, the third value is different than the fourth value. Further, in various implementations, the third value is different than the first value. Accordingly, by applying the first quantization matrix 400A, the second spatial frequency is quantized differently (e.g., more strongly) than the first spatial frequency.

The first quantization matrix 400A includes a fifth value QhhA for a third spatial frequency (e.g., a highest frequency in the horizontal and vertical dimensions). The second quantization matrix 400B includes a sixth value QhhB for the third spatial frequency. In various implementations, the fifth value is different than the sixth value. Further, in various implementations, the fifth value is different than the third value and/or the first value. Accordingly, by applying the first quantization matrix 400A, the third spatial frequency is quantized differently (e.g., more strongly) than the second spatial frequency and/or the first spatial frequency.

Further, in various implementations, the first quantization matrix 400A and the second quantization matrix 400B differ by more than just a scaling factor. Accordingly, a first ratio of the first value to the third value (or the fifth value) is different than a second ratio of the second value to the fourth value (or the sixth value). In other words, the first value divided by the third value (or the fifth value) is different from the second value divided by the fourth value (or the sixth value). Thus, $QllA/QlhA \neq QllB/QlhB$. Similarly, a third ratio of the third value to the fifth value is different than a fourth ratio of the fourth value to the sixth value. In other words, the third value divided by the fifth value is different from the fourth value divided by the sixth value. Thus, $QlhA/QhhA \neq QlhB/QhhB$.

Further, in various implementations, the first quantization matrix 400A and the second quantization matrix 400B differ by more than just an adjustment factor. Accordingly, a first difference between the first value and the third value (or the fifth value) is different than a second difference between the second value and the fourth value (or the sixth value). In other words, the third value (or the fifth value) subtracted from the first value (or the fifth value) is different from the fourth value (or the sixth value) subtracted from the second value. Thus, $(QllA-QlhA) \neq (QllB-QlhB)$. Similarly, a third difference between the third value and the fifth value is different than a fourth difference between the fourth value and the sixth value. In other words, the fifth value subtracted from the third value is different from the sixth value subtracted from the fourth value. Thus, (QlhA-QhhA)≠(QlhB-QhhB).

In various implementations, the quantizer 114 selects the quantization matrix for a particular spatial portion (e.g., a slice or a block) from a plurality of predefined quantization matrices. In various implementations, the quantizer 114 generates the quantization matrix for a particular spatial portion based on one or more heuristics.

In various implementations, the quantizer 114 obtains the quantization matrix for a particular spatial portion based on the signal-to-noise ratio of the particular block. For example, for a particular spatial portion with a higher signal-to-noise ratio, a first quantization matrix is obtained that more strongly quantizes higher spatial frequencies as compared to a second quantization matrix obtained for a different spatial portion with a lower signal-to-noise ratio.

In various implementations, the quantizer 114 obtains the quantization matrix for a particular spatial portion based on a target bit rate for the particular spatial portion. For example, for a particular spatial portion with a lower target bit rate, a first quantization matrix is obtained that more strongly quantizes higher spatial frequencies as compared to a second quantization matrix obtained for a different spatial portion with a higher target bit rate.

In various implementations, the quantizer 114 obtains the quantization matrix for a particular spatial portion based on a contrast of the particular spatial portion. For example, for a particular spatial portion with a lower contrast, a first quantization matrix is obtained that more strongly quantizes higher spatial frequencies as compared to a second quantization matrix obtained for a different spatial portion with higher contrast.

In various implementations, the quantizer 114 obtains the quantization matrix for a particular spatial portion based on a dynamism of the particular spatial portion (as compared to the particular spatial portion from a previous frame). For example, for a particular spatial portion with a low dynamism (e.g., the spatial portion is similar to a corresponding spatial portion of a previous frame), a first quantization matrix is obtained that more strongly quantizes higher spatial frequencies as compared to a second quantization matrix obtained for a different spatial portion with higher dynamism.

In various implementations, the quantizer 114 obtains the quantization matrix for a particular spatial portion based on channel conditions of a channel over which the encoded video 121 will be transmitted. For example, in various implementations, the quantizer 114 obtains different quantization matrices depending on whether beamforming is used. As another example, in various implementations, the quantizer 114 obtains different quantization matrices depending on the signal-to-noise ratio of the channel. As another example, in various implementations, the quantizer 114 obtains different quantization matrices depending on whether the channel conditions are static or dynamic.

In various implementations, the quantizer 114 obtains the quantization matrix for a particular spatial portion based on the channel of the spatial portion. For example, in various implementations, the quantizer 114 obtains different quantization matrices for a luma channel and a chroma channel. In various implementations, the quantizer 114 obtains different quantization matrices for a red channel and a green channel. In various implementations, the quantizer 114 obtains different quantization matrices for a depth channel or an alpha channel and a visible channel (e.g. a color [red, green, blue, etc.] channel, a luma channel, or a chroma channel).

In various implementations, the quantizer 114 includes a plurality of different quantizers applying different quantization methods (e.g., rounding, flooring, mid-tread, mid-riser, etc.). Accordingly, in various implementations, the quantization matrix for a particular spatial portion is based on the quantizer (of a plurality of different quantizers) applied to the particular spatial portion.

In one embodiment, the quantizer 114 selects the quantization matrix from 16 predefined quantization matrices. The 16 predefined quantization matrices include 4 quantization matrices for visible spatial portions with low signal-to-noise ratio. Each of the 4 quantization matrices for spatial portions with low signal-to-noise ratio are associated with different target bit rates (e.g., a high target bit rate, a media target bit rate, a low target bit rate, and a very low target bit rate). The 16 predefined quantization matrices include 4 quantization matrices for visible spatial portions with medium signal-to-noise ratio. Each of the 4 quantization matrices for spatial portions with medium signal-to-noise ratio are associated with different target bit rates (e.g., a high target bit rate, a media target bit rate, a low target bit rate, and a very low target bit rate). The 16 predefined quantization matrices include 4 quantization matrices for visible spatial portions with high signal-to-noise ratio. Each of the 4 quantization matrices for spatial portions with low signal-to-noise ratio are associated with different target bit rates (e.g., a high target bit rate, a media target bit rate, a low target bit rate, and a very low target bit rate). The 16 predefined quantization matrices include 4 quantization matrices for data spatial portions (e.g. depth, alpha, or other data). Each of the 4 quantization matrices for data spatial portions are associated with different target bit rates (e.g., a high target bit rate, a media target bit rate, a low target bit rate, and a very low target bit rate). The thresholds between low signal-to-noise ratio, medium signal-to-noise ratio, and high signal-to-noise ratio may be configurable and/or based on empirical evidence. Similarly, the thresholds between high target bit rate, medium target bit rate, low target bit rate, and very low target bit rate may be configurable and/or based on empirical evidence. In general, the thresholds (and the predefined quantization matrices) are configured to help to maintain a target bitrate at a low bitrate by aggressive quantizing high frequency coefficients and are further configured to preserve subjective visual quality but modulating the amount of quantization for each frequency coefficient based on human sensitivity to its respective spatial frequency.

Because the quantizer 114 obtains the quantization matrix based on characteristics of the unencoded image and/or changing channel conditions, in various implementations, the quantizer 114 applies different quantization matrices to the respective blocks of the same spatial portion in different frames of the unencoded video 101.

In various implementations, as described in detail below, the quantizer 114 quantizes a particular block based on a quantization matrix scaled (e.g., multiplied) by a quantization scaling parameter.

Referring again to FIG. 1, the video encoder 110 includes a variable-length encoder (VLC) 116 that receives a quantized block from the quantizer 114 and encodes the quantized block to generate an encoded block. In various implementations, the VLC 116 applies Golomb-Rice coding, exponential Golomb coding, run-length coding, and/or differential coding.

The postprocessor 119 receives encoded blocks from the VLC 116 and composes the encoded blocks into the encoded video 121. In various implementations, the postprocessor 119 composes encoded blocks of a slice into a slice data structure including a slice header. In various implementations, the slice header includes an indication of the quantization matrix (and/or the quantization scaling parameter) applied by the quantizer 114 to blocks of that slice. In various implementations, the indication indicates selection of one of a plurality of predefined quantization matrices. In various implementations, the indication includes the quantization matrix itself (including the quantization parameters thereof).

In various implementations, the postprocessor 119 composes slices of a frame into a frame data structure including a frame header. In various implementations, the frame header includes indications of the quantization matrices applied to different channels. In various implementations, the indication indicates selection of one of a plurality of predefined quantization matrices. In various implementations, the indication includes the quantization matrix itself (including the quantization parameters thereof).

As noted above, the quantizer 114 quantizes the transformed blocks based on a quantization matrix (which has different quantization parameter values for different spatial frequencies) and a quantization scaling parameter (which has a single value for the entire block).

The quantization scaling parameters are determined to ensure that a target bit rate for the encoded video 121 is met. In various implementations, the quantization scaling parameter is determined for each slice of an image and applied to each block of the slice. To that end, each slice of an image is categorized based on a rate-distortion (RD) curve of the slice and a set of rate thresholds. The quantization scaling parameter is based on the categorization.

In various implementations, each slice is categorized based on comparing a function of the plurality of quantization scaling parameters to corresponding threshold rates at the plurality of quantization scaling parameters. For example, in various implementations, each slice is categorized based on comparing the bit rate of the slice at each of a plurality of quantization scaling parameters to corresponding threshold rates at the plurality of quantization scaling parameters. In various implementations, the lowest quantization parameter at which the bit rate of the slice is less than the corresponding threshold rate determines the category of the slice. For example, if the bit rate of the slice at the first quantization scaling parameter is less than the first threshold rate, the slice is categorized into a first category (Category I). If the bit rate of the slice at the first quantization scaling parameter is greater than the first threshold rate, but the bit rate of the slice at the second quantization scaling parameter is less than the second threshold rate, the slice is categorized into a second category (Category II). If the bit rate of the slice at the second quantization scaling parameter is greater than the second threshold rate, but the bit rate of the slice at the third quantization scaling parameter is less than the third threshold rate, the slice is categorized into a third category (Category III). If the bit rate of the slice at the third quantization scaling parameter is greater than the third threshold rate, but the bit rate of the slice at the fourth quantization scaling parameter is less than the fourth threshold rate, the slice is categorized into a fourth category (Category IV).

Figure 5A:
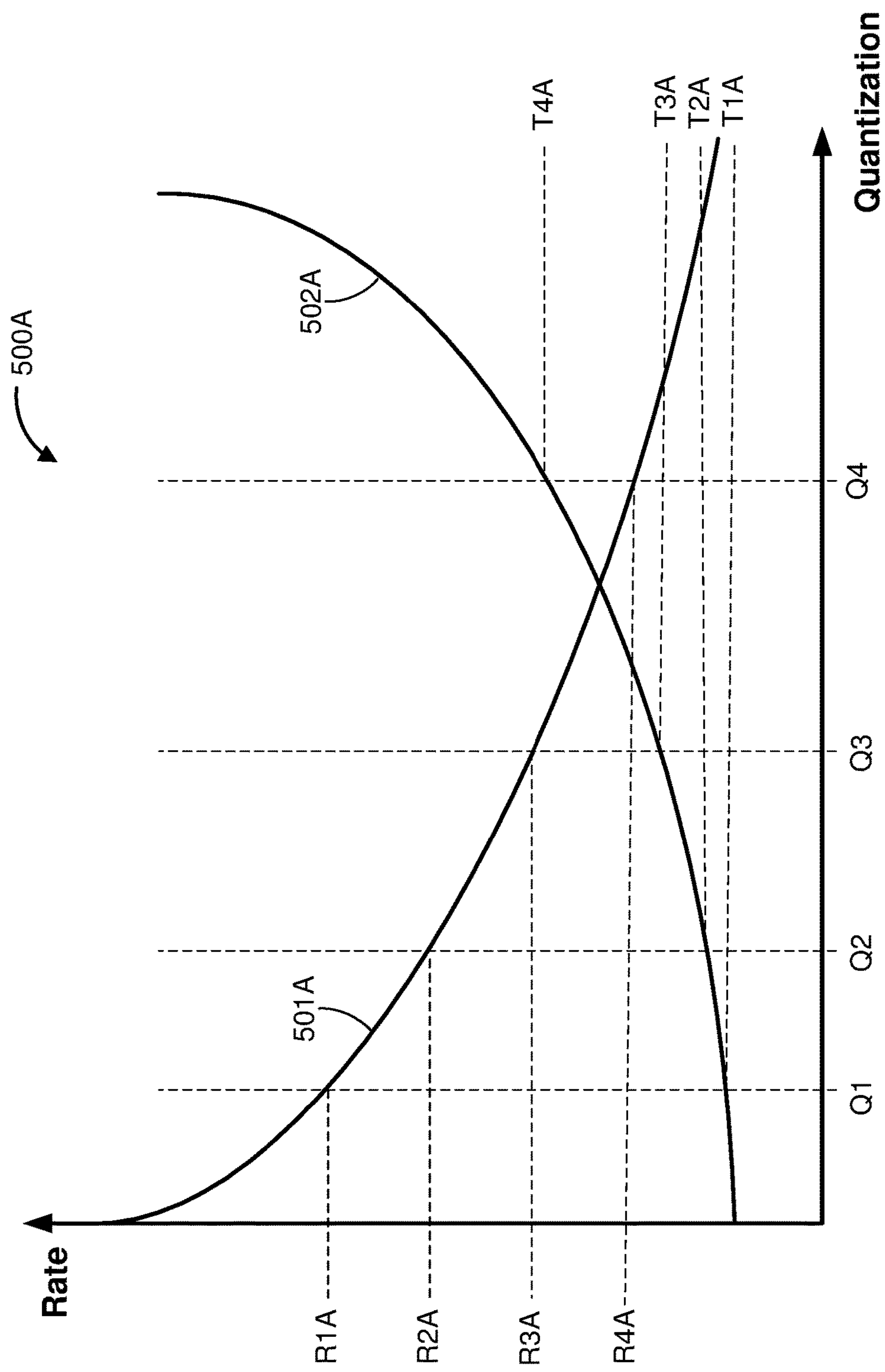
FIG. 5A illustrates a first rate-vs-quantization plot including a first rate-distortion curve of a first slice and a default rate-threshold curve.

FIG. 5A illustrates a first rate-vs-quantization plot 500A including a first rate-distortion curve 501A of a first slice and a default rate-threshold curve 502A. For a first quantization scaling parameter Q1, the bit rate of the first slice is a first bit rate R1A and a first threshold rate T1A is defined. For a second quantization scaling parameter Q2, the bit rate of the first slice is a second bit rate R2A and a second threshold rate T2A is defined. For a third quantization scaling parameter Q3, the bit rate of the first slice is a third bit rate R3A and a third threshold rate T3A is defined. For a fourth quantization scaling parameter Q4, the bit rate of the first slice is a fourth bit rate R4A and a fourth threshold rate T4A is defined.

In various implementations, the second quantization scaling parameter Q2 is three times the first quantization scaling parameter Q1, the third quantization scaling parameter Q3 is three times the second quantization scaling parameter Q2, and the fourth quantization scaling parameter Q4 is three times the third quantization scaling parameter Q3. Thus, Q4=3*Q3=9*Q2=27*Q1.

Accordingly, because the third bit rate R3A is greater than the third threshold rate T3A, but the fourth bit rate R4A is less than the fourth threshold rate T4A, the first slice is categorized as Category IV.

Figure 5B:
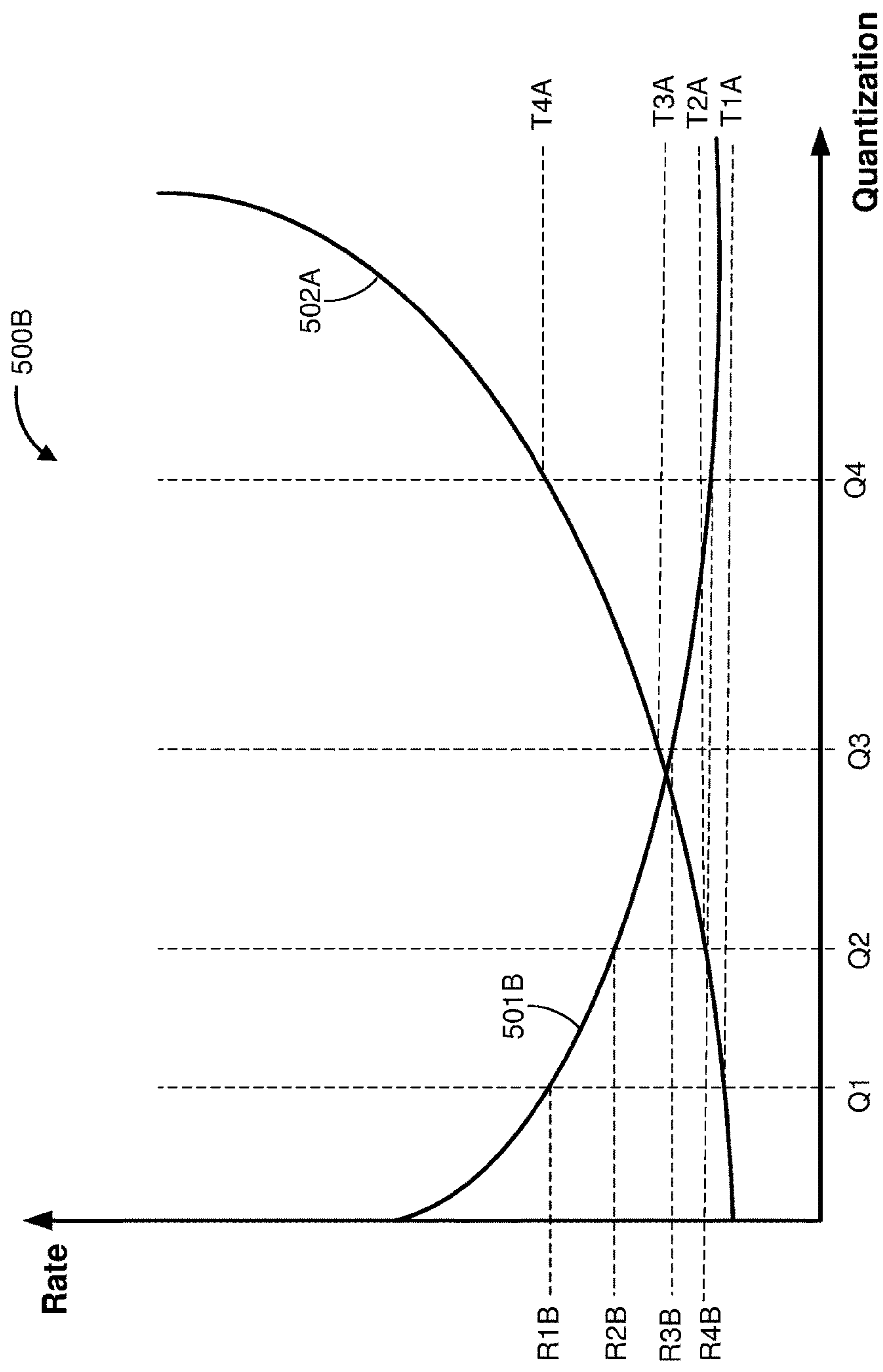
FIG. 5B illustrates a second rate-vs-quantization plot including a second rate-distortion curve of a second slice and the default rate-threshold curve.

FIG. 5B illustrates a second rate-vs-quantization plot 500B including a second rate-distortion curve 501B of a second slice and the default rate-threshold curve 502A. For the first quantization scaling parameter Q1, the bit rate of the second slice is a first bit rate R1B. For the second quantization scaling parameter Q2, the bit rate of the second slice is a second bit rate R2B. For the third quantization scaling parameter Q3, the bit rate of the second slice is a third bit rate R3B. For the fourth quantization scaling parameter Q4, the bit rate of the second slice is a fourth bit rate R4B.

Accordingly, because the second bit rate R2B is greater than the second threshold rate T2A, but the third bit rate R3B is less than the third threshold rate T3A, the second slice is categorized as Category III.

In various implementations, the threshold rates are determined based on the target bit rate for the slice. For example, in various implementations, a default setting is used and the first threshold rate T1A is the target bit rate for the slice divided by 5, the second threshold rate T2A is the target bit rate for the slice divided by 4, the third threshold rate T3A is the target bit rate for the slice divided by 3, the fourth threshold rate T4A is the target bit rate for the slice divided by 2, and a fifth threshold rate T5A is the target bit rate for the slice divided by 1.

As another example, in various implementations, a flat setting is used and a first threshold rate T1B, a second threshold rate T2B, a third threshold rate T3B, a fourth threshold rate T4B, and a fifth threshold rate TSB is the target bit rate for the slice (or the target bit rate for the slice divided by a factor, such as 3).

Figure 5C:
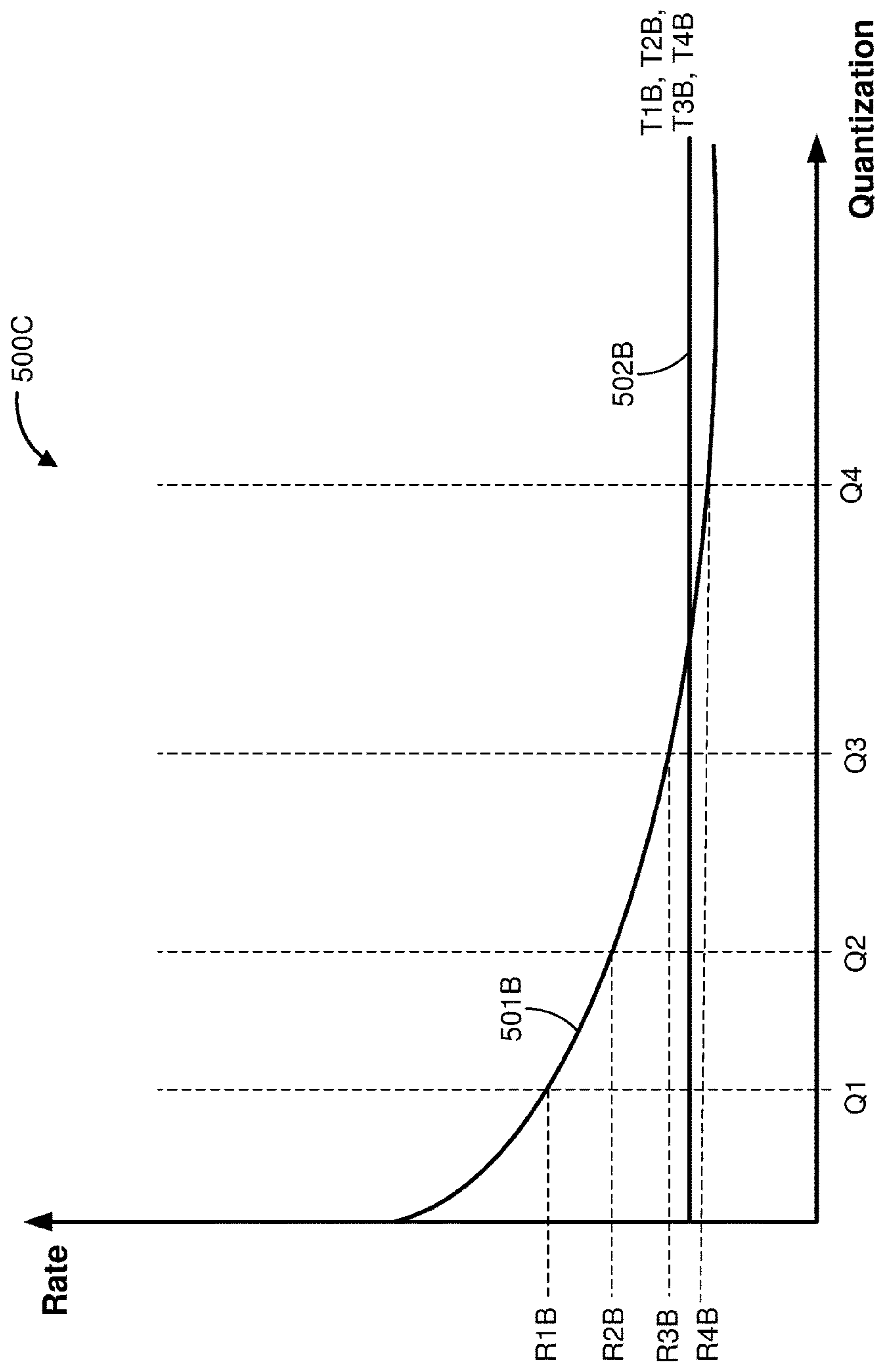
FIG. 5C illustrates a third rate-vs-quantization plot including the second rate-distortion curve of the second slice and a flat rate-threshold curve.

FIG. 5C illustrates a third rate-vs-quantization plot 500C including the second rate-distortion curve 501B of the second slice and a flat rate-threshold curve 502B. For the first quantization scaling parameter Q1, a first threshold rate T1B is defined. For the second quantization scaling parameter Q2, a second threshold rate T2B is defined. For the third quantization scaling parameter Q3, a third threshold rate T3B is defined. For the fourth quantization scaling parameter Q4, a fourth threshold rate T4B is defined. In the flat rate-threshold curve 502, the first threshold rate T1B, the second threshold rate T2B, the third threshold rate T3B, and the fourth threshold rate T4B are equal.

Accordingly, because the third bit rate R3B is greater than the third threshold rate T3B, but the fourth bit rate R4B is less than the fourth threshold rate T4B, the second slice is categorized as Category IV with the flat setting.

With the default setting, the lower categories of slices are encoded conservatively with high quantization, in order to save bits for the highest category. Such a setting leads to a fairly narrow quantization spread. With the flat setting, the lower categories of slices and higher categories of slices are encoded with a more balanced quant distribution. Such a setting leads to the most wide quantization spread.

The ideal quantization spread for a given content should lie in between the two extreme cases. Accordingly, in various implementations, the threshold rates are based on the target bit rate for the slice and a configurable quantization spread parameter. In various implementations, the quantization spread parameter is a value between 1 and 100.

In various implementations, where R is the target bit rate for the slice and Q is the quantization spread parameter, the ith threshold rate is:

$$\frac{R}{\frac{(1-100/Q)(i-1)}{4}+100/Q}$$

With the quantization spread parameter set to 20, the threshold rates match the default setting. With the quantization spread parameter set to 100, the threshold rates match the flat setting. With the quantization spread parameter set to 50, the first threshold rate is R divided by 2, the second threshold rate is R divided by 1.75, the third threshold rate is R divided by 1.5, the fourth threshold rate is R divided by 1.25, and the fifth threshold rate is R divided by 1.

As noted above, each slice of an image is categorized into one of a plurality of categories and the quantization scaling parameter is based on the categorization. Each category is associated with a range from a low quantization scaling parameter and a high quantization scaling parameter. For example, in FIG. 5A, the third category (Category III) is associated with a range from the third quantization parameter Q3 to the fourth quantization parameter Q4.

In various implementations, the quantization scaling parameter is selected as the high quantization parameter of the category. Accordingly, the quantization scaling parameter for slices categorized in the first category (Category I) is the first quantization scaling parameter Q1, the quantization scaling parameter for slices categorized in the second category (Category II) is the second quantization scaling parameter Q2, the quantization scaling parameter for slices categorized in the third category (Category III) is the third quantization scaling parameter Q3, etc.

Thus, in various implementations, all slices categorized into the same category are assigned the same quantization scaling parameter. Assigning the quantization scaling parameter is such a way does not attempt to meet an optimal target size, but attempts to ensure that the size of the encoded slice is below a threshold.

Accordingly, in various implementations, the quantization scaling parameter for a slice categorized in a category is selected as a quantization scaling parameter between the low quantization scaling parameter and the high quantization scaling parameter (e.g., using interpolation).

As described above, a slice is categorized into a category associated with a low quantization parameter Ql (and corresponding low threshold rate Tl) and a high quantization scaling parameter Qh (and corresponding high threshold rate Th). Further, the category is associated with a middle quantization parameter Qm lying between Ql and Qh (e.g., the average of Ql and Qh). For the middle quantization scaling parameter Qm, the bit rate of the slice is a middle bit rate Rm. In various implementations, the middle quantization scaling parameter Qm is the arithmetic mean of the low quantization parameter Ql and the high quantization parameter Qh. In various implementations, the middle quantization scaling parameter Qm is the geometric mean of the low quantization parameter Ql and the high quantization parameter Qh.

Figure 6:
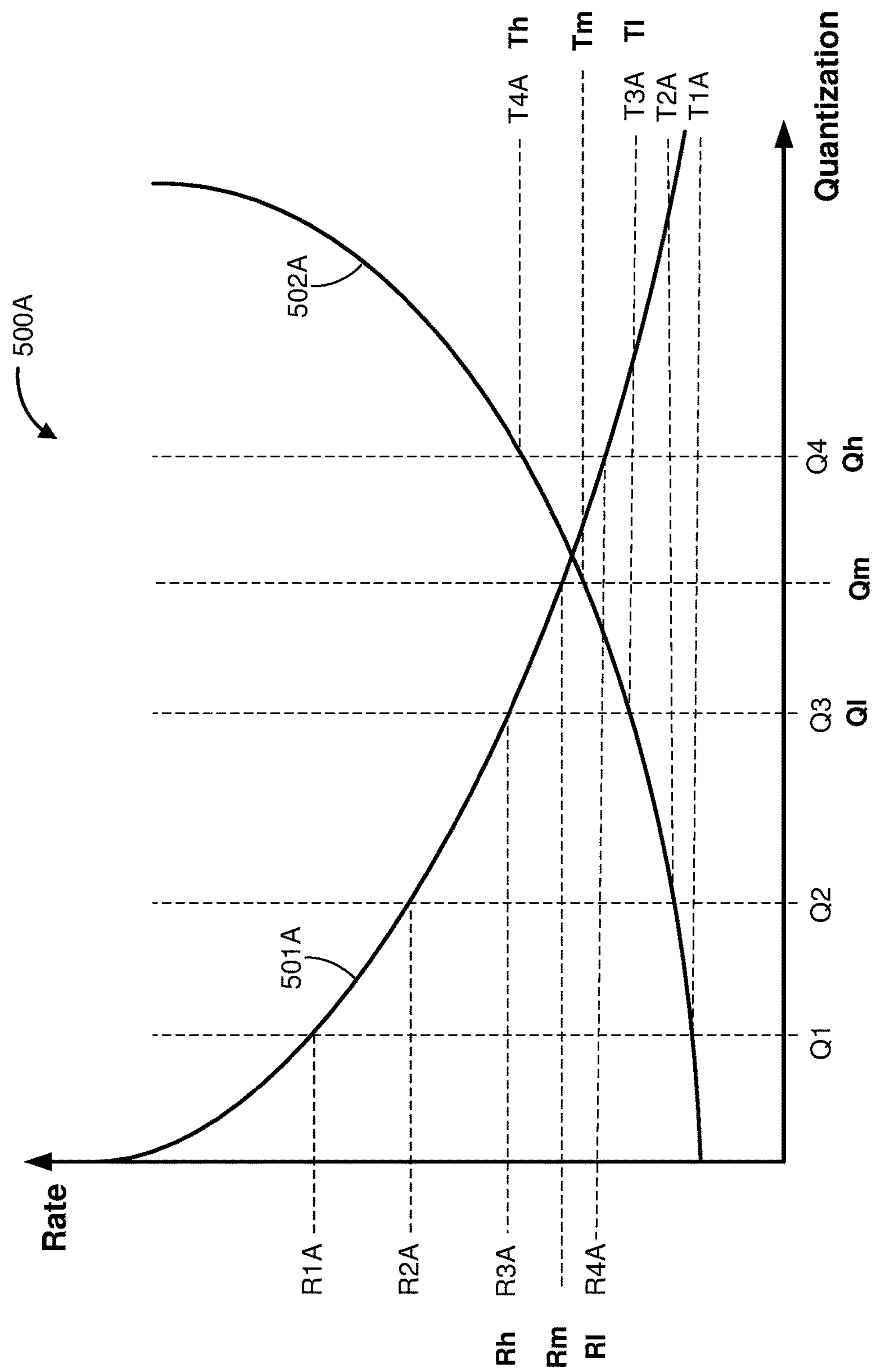
FIG. 6 illustrates the first rate-vs-quantization plot of FIG. 5A with additional annotations.

FIG. 6 illustrates the first rate-vs-quantization plot 500A of FIG. 5A with additional annotations. In particular, in FIG. 6, for the first slice categorized into the third category (Category III), the low quantization parameter Ql (and corresponding low threshold rate Tl), the high quantization parameter Qh (and corresponding high threshold rate Th), middle quantization parameter Qm, and middle bit rate Rm are illustrated.

If the middle bit rate Rm is less than the high threshold rate Th (as it is in FIG. 6), the slice is assigned the middle quantization scaling parameter Qm. Otherwise, the slice is assigned the high quantization parameter Qh.

In various implementations, the category is associated with a middle threshold rate Tm lying between Tl and Th (e.g., the average of Tl and Th). If the middle bit rate Rm is less than the middle threshold rate Tm (unlike FIG. 6), the slice is assigned the middle quantization scaling parameter Qm. Otherwise, the slice is assigned the high quantization scaling parameter Qh.

Figure 7:
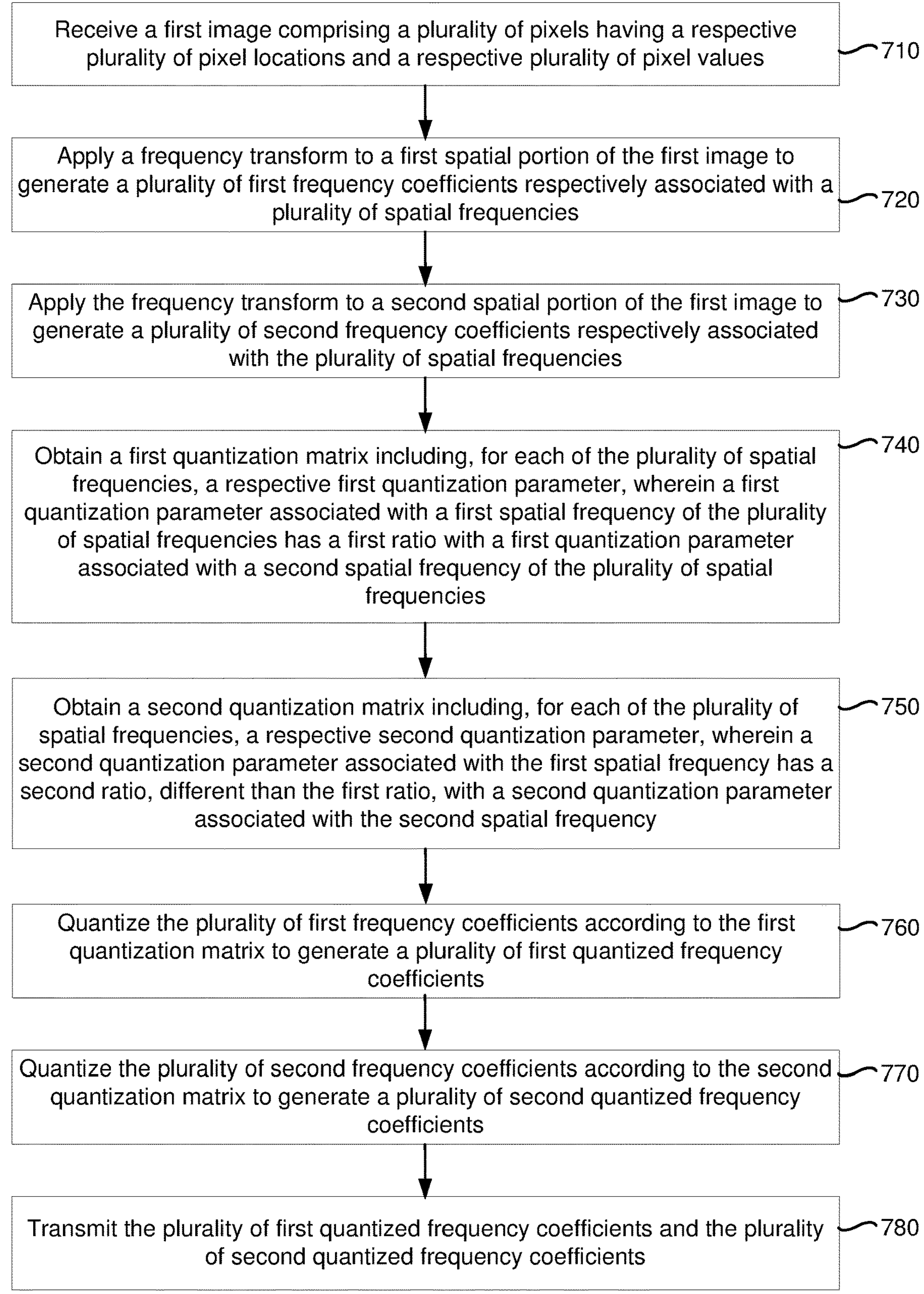
FIG. 7 is a flowchart representation of a first method of encoding an image in accordance with some implementations.

FIG. 7 is a flowchart representation of a first method 700 of encoding an image in accordance with some implementations. In various implementations, the method 700 is performed by a device with one or more processors and non-transitory memory. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory). Briefly, in some circumstances, the method 700 includes applying two different quantization matrices to two different frequency-transformed spatial portions of an image.

The method 700 begins, in block 710, with the device receiving a first image comprising a plurality of pixels having a respective plurality of pixel locations and a respective plurality of pixel values. In various implementations, the first image is an unencoded image, such as the unencoded image 200 of FIG. 2.

The method 700 continues, in block 720, with the device applying a frequency transform to a first spatial portion of the first image to generate a plurality of first frequency coefficients respectively associated with a plurality of spatial frequencies. In various implementations, the frequency transform is a DCT transform. In various implementations, the first spatial portion is a first block of a first slice of the first image.

The method 700 continues, in block 730, with the device applying the frequency transform to a second spatial portion of the first image to generate a plurality of second frequency coefficients respectively associated with the plurality of spatial frequencies. In various implementations, the second spatial portion is a second block of the first slice of the first image. In various implementations, the second spatial portion is a first block of a second slice of the first image.

The method 700 continues, in block 740, with the device obtaining a first quantization matrix including, for each of the plurality of spatial frequencies, a respectively first quantization parameter, wherein a first quantization parameter associated with a first spatial frequency of the plurality of spatial frequencies has a first ratio with a first quantization parameter associated with a second spatial frequency of the plurality of spatial frequencies.

The method 700 continues, in block 750, with the device obtaining a second quantization matrix including, for each of the plurality of spatial frequencies, a respectively second quantization parameter, wherein a second quantization parameter associated with the first spatial frequency has a second ratio, different than the first ratio, with a second quantization parameter associated with the second spatial frequency.

In various implementations, the first quantization matrix is obtained based on a signal-to-noise ratio of the first spatial portion. In various implementations, the second quantization matrix is obtained based on a signal-to-noise ratio of the second spatial portion (which may be the same as or different than the signal-to-noise ratio of the first spatial portion).

In various implementations, the first quantization matrix is obtained based on a target bit rate of the first spatial portion. In various implementations, the second quantization matrix is obtained based on a target bit rate of the second spatial portion (which may be the same as or different than the target bit rate of the first spatial portion).

In various implementations, the first quantization matrix is obtained based on a contrast of the first spatial portion. In various implementations, the second quantization matrix is obtained based on a contrast of the second spatial portion (which may be the same as or different than the contrast of the first spatial portion).

In various implementations, the first quantization matrix is obtained based on a dynamism of the first spatial portion as compared to a corresponding spatial portion of a previous image. In various implementations, the second quantization matrix is obtained based on a dynamism of the second spatial portion (which may be the same as or different than the dynamism of the first spatial portion).

In various implementations, the first quantization matrix is obtained based on channel conditions of a communications channel over which the plurality of first quantized coefficients are transmitted. In various implementations, the channel conditions include at least one of a signal-to-noise ratio, a channel dynamism, or a beamforming pattern. In various implementations, the second quantization matrix is obtained based on channel conditions of a communications channel over which the plurality of second quantized coefficients are transmitted (which may be the same as or different than the channel conditions of the communications channel over which the plurality of first quantized coefficients are transmitted).

In various implementations, obtaining the first quantization matrix includes selecting a quantization matrix from a plurality of predetermined quantization matrices. In various implementations, obtaining the second quantization matrix includes selecting a different quantization matrix from the plurality of predetermined quantization matrices.

The method 700 continues, in block 760, with the device quantizing the plurality of first frequency coefficients according to the first quantization matrix to generate a plurality of first quantized frequency coefficients.

The method 700 continues, in block 770, with the device quantizing the plurality of second frequency coefficients according to the second quantization matrix to generate a plurality of second quantized frequency coefficients.

The method 700 continues, in block 780, with the device transmitting the plurality of first quantized frequency coefficients and the plurality of second quantized frequency coefficients. In various implementations, transmitting the plurality of first quantized frequency coefficients and the plurality of second quantized frequency coefficients includes encoding the quantized frequency coefficients (e.g., run-length encoding) and transmitting the encoded quantized frequency coefficients.

In various implementations, the method 700 includes obtaining a third quantization matrix including, for each of the plurality of spatial frequencies, a respective third quantization parameter, wherein a third quantization parameter associated with the first spatial frequency has a third ratio, different than first ratio, with a third quantization parameter associated with the second spatial frequency. Further, the method 700 includes quantizing a plurality of third frequency coefficients associated with a first spatial portion of a second image corresponding to the first spatial portion of the first image according to the third quantization matrix to generate a plurality of third quantized frequency coefficients and transmitting the plurality of third quantized frequency coefficients.

Thus, in addition to quantizing two different spatial portions of the same image with two different quantization matrices, in various implementations, the method 700 includes quantizing the same spatial portion of two different images with two different quantization matrices.

In various implementations, the first image is a first channel of a multi-channel image and the second image is a second channel of the multi-channel image, wherein the first quantization matrix is obtained based on the first channel and the third quantization matrix is obtained based on the second channel. For example, in various implementations, the first channel is a visible channel and the second channel is a data channel.

In various implementations, the first image is a first channel of a first multi-channel image associated with a first frame and the second image is the first channel of a second multi-channel image associated with a second frame. For example, in various implementations, the first channel is a luma channel, a chroma channel, or a color channel.

Figure 8:
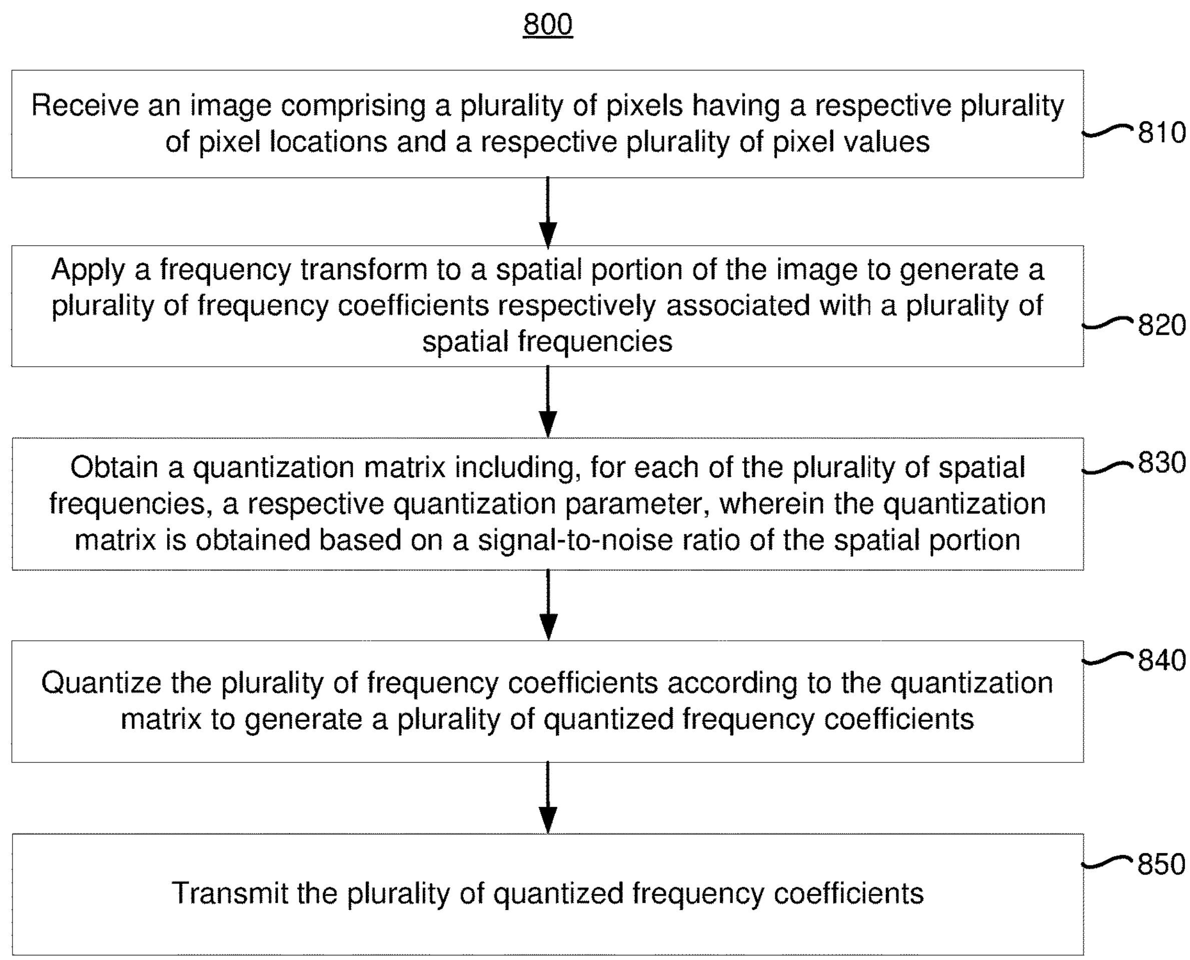
FIG. 8 is a flowchart representation of a second method of encoding an image in accordance with some implementations.

FIG. 8 is a flowchart representation of a second method 800 of encoding an image in accordance with some implementations. In various implementations, the method 800 is performed by a device with one or more processors and non-transitory memory. In some implementations, the method 700 is performed by processing logic, including hardware, firmware, software, or a combination thereof. In some implementations, the method 800 is performed by a processor executing instructions (e.g., code) stored in a non-transitory computer-readable medium (e.g., a memory). Briefly, in some circumstances, the method 800 includes applying a quantization matrix to a frequency-transformed spatial portions of an image based on the signal-to-noise ratio of the image.

The method 800 begins, in block 810, with the device receiving an image comprising a plurality of pixels having a respective plurality of pixel locations and a respective plurality of pixel values. In various implementations, the image is an unencoded image, such as the unencoded image 200 of FIG. 2.

The method 800 continues, in block 820, with the device applying a frequency transform to a spatial portion of the image to generate a plurality of frequency coefficients respectively associated with a plurality of spatial frequencies. In various implementations, the frequency transform is a DCT transform. In various implementations, the spatial portion of the image is a block of the image or a slice of the image.

The method 800 continues, in block 830, with the device obtaining a quantization matrix including, for each of the plurality of spatial frequencies, a respective quantization parameter, wherein the quantization matrix is obtained based on a signal-to-noise ratio of the spatial portion.

In various implementations, the signal-to-noise ratio of the spatial portion is the signal-to-noise ratio of the image. In various implementations, the signal-to-noise ratio of the spatial portion is different than the signal-to-noise ratio of a different spatial portion.

In various implementations, the quantization matrix is obtained further based on a target bit rate of the spatial portion. In various implementations, the quantization matrix is obtained further based on contrast of the spatial portion. In various implementations, the quantization matrix is obtained further based on a dynamism of the spatial portion as compared to a corresponding spatial portion of a previous image. In various implementations, the quantization matrix is obtained further based on channel conditions of a communications channel over which the plurality of quantized frequency coefficients are transmitted. For example, in various implementations, the channel conditions include at least one of a signal-to-noise ratio, a channel dynamism, or a beamforming pattern.

In various implementations, the image is a first channel of a multi-channel image and the quantization matrix is obtained based on the first channel. For example, in various implementations, the first channel is a data channel, a color channel, a luma channel, or a chroma channel.

The method 800 continues, in block 840, with the device quantizing the plurality of frequency coefficients according to the quantization matrix to generate a plurality of quantized frequency coefficients.

The method 800 continues, in block 850, with the device transmitting the plurality of quantized frequency coefficients. In various implementations, transmitting the plurality of quantized frequency coefficients included encoding the quantized frequency coefficients (e.g., run-length encoding) and transmitting the encoded quantized frequency coefficients.

In various implementations, obtaining the quantization matrix (in block 830) includes selecting a quantization matrix from a plurality of predetermined quantization matrices. In various implementations, transmitting the plurality of quantized frequency coefficients (in block 850) includes transmitting an indication of the selected quantization matrix.

Figure 9:
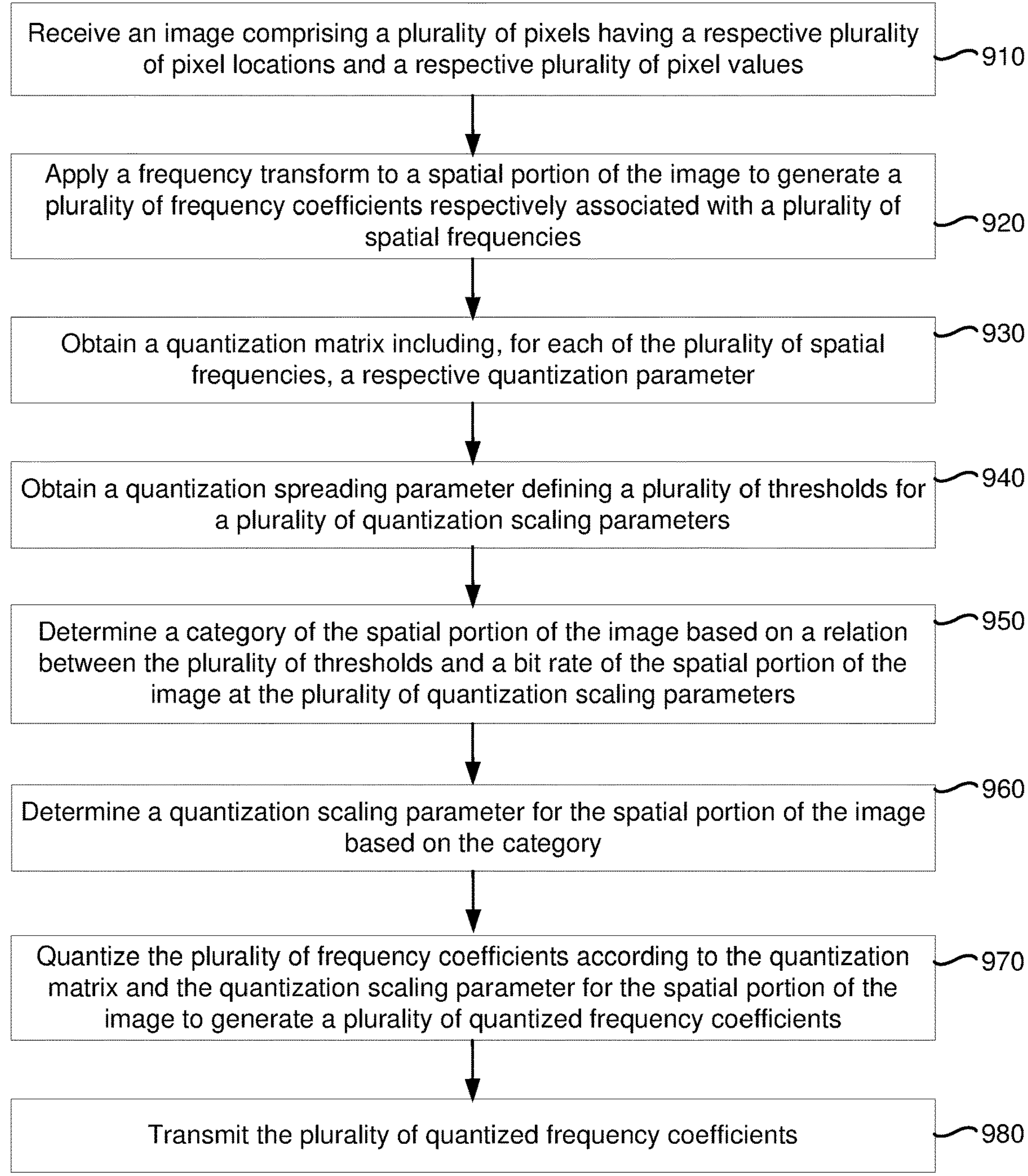
FIG. 9 is a flowchart representation of a third method of encoding an image in accordance with some implementations.

FIG. 9 is a flowchart representation of a third method 900 of encoding an image in accordance with some implementations. In various implementations, the method 900 is performed by a device with one or more processors and non-transitory memory. In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory). Briefly, in some circumstances, the method 900 includes categorizing a frequency-transformed spatial portion of an image based on a quantization spreading parameter and applying a quantization scaling parameter to the frequency-transformed spatial portion of the image based on the categorization.

The method 900 begins, in block 910, with the device receiving an image comprising a plurality of pixels having a respective plurality of pixel locations and a respective plurality of pixel values. In various implementations, the image is an unencoded image, such as the unencoded image 200 of FIG. 2.

The method 900 continues, in block 920, with the device applying a frequency transform to a spatial portion of the image to generate a plurality of frequency coefficients respectively associated with a plurality of spatial frequencies. In various implementations, the frequency transform is a DCT transform. In various implementations, the spatial portion of the image is a block of the image or a slice of the image.

The method 900 continues, in block 930, with the device obtaining a quantization matrix including, for each of the plurality of spatial frequencies, a respective quantization parameter, wherein the quantization matrix is obtained based on a signal-to-noise ratio of the spatial portion.

The method 900 continues, in block 940, with the device obtaining a quantization spreading parameter defining a plurality of thresholds for a plurality of quantization scaling parameters. In various implementations, obtaining the quantization spreading parameter includes receiving an indication of the quantization spreading parameter, e.g., from a user. In various implementations, obtaining the quantization spreading parameter includes determining the quantization spreading parameter based on, e.g., a signal-to-noise ratio of the image, a complexity of the image, or channel conditions of a channel over which the image (once encoded) is transmitted.

In various implementations, the plurality of thresholds are based on a target bit rate for the spatial portion of the image. In various implementations, the quantization spreading parameter defines a plurality of denominators and the plurality of thresholds are based on the target bit rate respectively divided by the plurality of denominators.

For example, in various implementations, for i between 1 and 5, wherein R is the target bit rate, and Q is the quantization spreading parameter, the plurality of thresholds are:

$$\frac{R}{\frac{(1-100/Q)(i-1)}{4}+100/Q}$$

In various implementations, for a particular value of the quantization spreading parameter, the plurality of thresholds are equal. For example, in equation above, for Q=100, the plurality of thresholds are equal.

In various implementations, the plurality of quantization scaling parameters includes a base value, three times the base value, and nine times the base value.

The method 900 continues, in block 950, with the device determining a category of the spatial portion of the image based on a relation between the plurality of thresholds and a bit rate of the spatial portion of the image at the plurality of quantization scaling parameters.

In various implementations, determining the category of the spatial portion of the image includes comparing the bit rate of the spatial portion of the image at each of the plurality of quantization scaling parameters to a corresponding threshold for each of the plurality of quantization scaling parameters.

In various implementations, determining the category of the spatial portion of the image includes determining the lowest quantization scaling parameter of the plurality of quantization scaling parameters at which the bit rate of the spatial portion of the image is less than the corresponding threshold.

In various implementations, the method 900 includes determining the bit rate of the spatial portion of the image at the plurality of quantization scaling parameters. In various implementations, determining the bit rate of the spatial portion of the image at the plurality of quantization scaling parameters comprises either, depending on at least one of a target bit rate of the spatial portion of the image, a signal-to-noise ratio of the spatial portion of the image, a complexity of the spatial portion of the image, or channel conditions of a channel over which the plurality of quantized frequency coefficients are transmitted, (1) determining an estimated bit rate of the spatial portion of the image at the plurality of quantization scaling parameters or (2) determining an actual bit rate of the spatial portion of the image at the plurality of quantization scaling parameters.

The method 900 continues, at block 960, with the device determining a quantization scaling parameter for the spatial portion of the image based on the category. In various implementations, determining the quantization scaling parameter for the spatial portion of the image based the category includes selecting a high quantization scaling parameter of the category. In various implementations, determining the quantization scaling parameter for the spatial portion of the image based the category includes selecting a quantization scaling parameter between a low quantization scaling parameter of the category and a high quantization scaling parameter of the category.

The method 900 continues, in block 970, with the device quantizing the plurality of frequency coefficients according to the quantization matrix and the quantization scaling parameter for the spatial portion of the image to generate a plurality of quantized frequency coefficients.

The method 900 continues, in block 980, with the device transmitting the plurality of quantized frequency coefficients. In various implementations, transmitting the plurality of quantized frequency coefficients included encoding the quantized frequency coefficients (e.g., run-length encoding) and transmitting the encoded quantized frequency coefficients.

In various implementations, as noted above, the spatial portion of the image is a block of the image. In various such implementations, determining a category of the spatial portion of the image (in block 950) includes determining a category of a slice including the block based on a relation between the plurality of thresholds and a bit rate of the slice at the plurality of quantization scaling parameters. Further, determining a quantization scaling parameter for the spatial portion of the image based the category (in block 960) includes determining a quantization scaling parameter for the block of the image and at least one other block of the slice based on the category of the slice.

Figure 10:
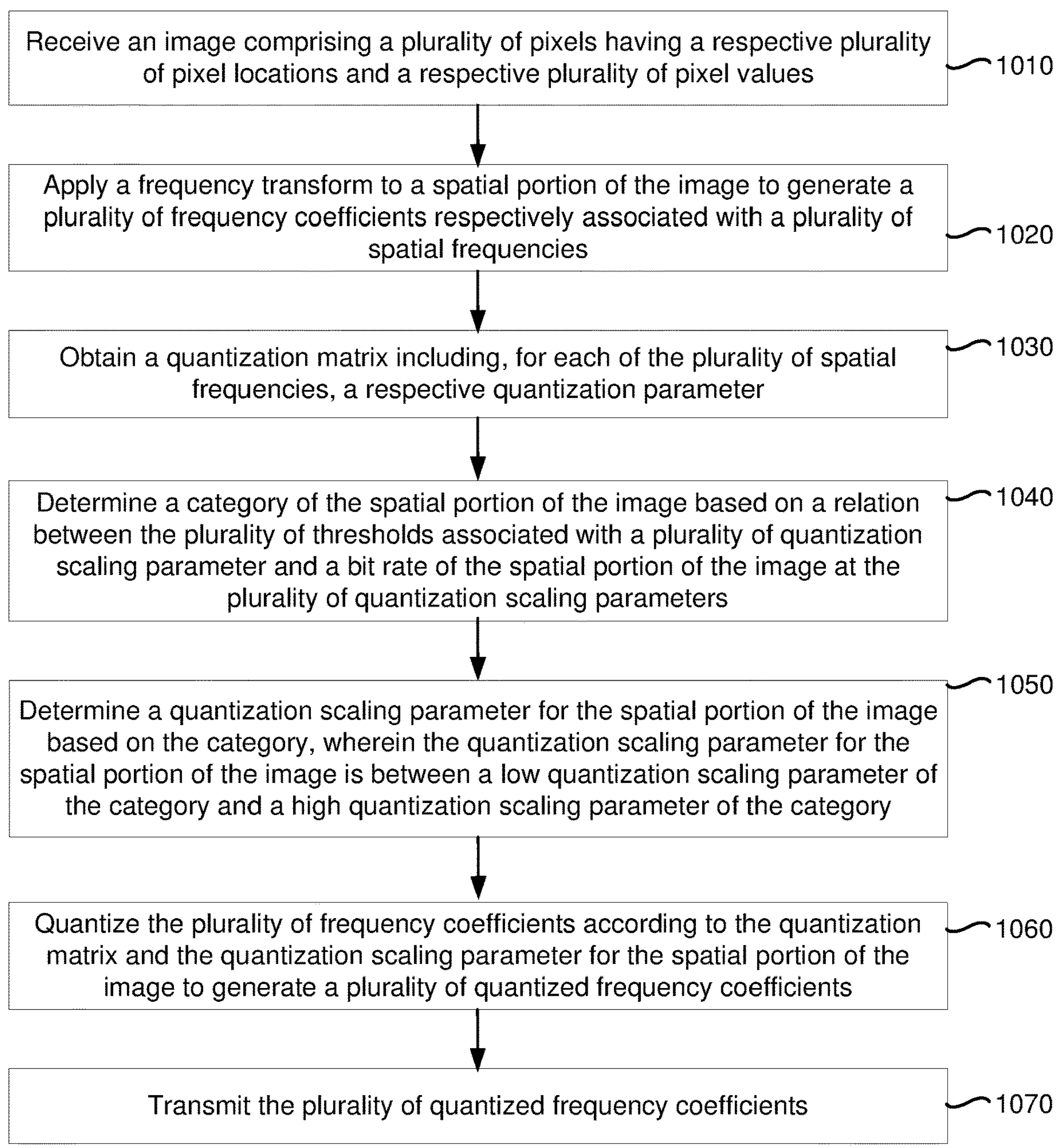
FIG. 10 is a flowchart representation of a fourth method of encoding an image in accordance with some implementations.

FIG. 10 is a flowchart representation of a fourth method 1000 of encoding an image in accordance with some implementations. In various implementations, the method 1000 is performed by a device with one or more processors and non-transitory memory. In some implementations, the method 900 is performed by processing logic, including hardware, firmware, software, or a combination thereof. In some implementations, the method 1000 is performed by a processor executing instructions (e.g., code) stored in a non-transitory computer-readable medium (e.g., a memory). Briefly, in some circumstances, the method 1000 includes categorizing a frequency-transformed spatial portion of an image and applying a quantization scaling parameter to the frequency-transformed spatial portion of the image between a low quantization scaling parameter of the category and a high quantization scaling parameter of the category.

The method 1000 begins, in block 1010, with the device receiving an image comprising a plurality of pixels having a respective plurality of pixel locations and a respective plurality of pixel values. In various implementations, the image is an unencoded image, such as the unencoded image 200 of FIG. 2.

The method 1000 continues, in block 1020, with the device applying a frequency transform to a spatial portion of the image to generate a plurality of frequency coefficients respectively associated with a plurality of spatial frequencies. In various implementations, the frequency transform is a DCT transform. In various implementations, the spatial portion of the image is a block of the image or a slice of the image.

The method 1000 continues, in block 1030, with the device obtaining a quantization matrix including, for each of the plurality of spatial frequencies, a respective quantization parameter, wherein the quantization matrix is obtained based on a signal-to-noise ratio of the spatial portion.

The method 1000 continues, in block 1040, with the device determining a category of the spatial portion of the image based on a relation between a plurality of thresholds associated with a plurality of quantization scaling parameters and a bit rate of the spatial portion of the image at the plurality of quantization scaling parameters.

In various implementations, determining the category of the spatial portion of the image includes comparing the bit rate of the spatial portion of the image at each of the plurality of quantization scaling parameters to a corresponding threshold for each of the plurality of quantization scaling parameters.

In various implementations, determining the category of the spatial portion of the image includes determining the lowest quantization scaling parameter of the plurality of quantization scaling parameters at which the bit rate of the spatial portion of the image is less than the corresponding threshold.

In various implementations, the method 1000 includes determining the bit rate of the spatial portion of the image at the plurality of quantization scaling parameters. In various implementations, determining the bit rate of the spatial portion of the image at the plurality of quantization scaling parameters comprises either, depending on at least one of a target bit rate of the spatial portion of the image, a signal-to-noise ratio of the spatial portion of the image, a complexity of the spatial portion of the image, or channel conditions of a channel over which the plurality of quantized frequency coefficients are transmitted, (1) determining an estimated bit rate of the spatial portion of the image at the plurality of quantization scaling parameters or (2) determining an actual bit rate of the spatial portion of the image at the plurality of quantization scaling parameters.

The method 1000 continues, at block 1050, with the device determining a quantization scaling parameter for the spatial portion of the image based on the category, wherein the quantization scaling parameter for the spatial portion of the image is between a low quantization scaling parameter of the category and a high quantization scaling parameter of the category. In various implementations, the high quantization scaling parameter of the category is three times the low quantization parameter of the category.

In various implementations, the quantization scaling parameter for the spatial portion of the image is the mean (e.g., the arithmetic mean or the geometric mean) of the low quantization scaling parameter of the category and the high quantization scaling parameter of the category.

In various implementations, determining the quantization scaling parameter for the spatial portion of the image includes determining a middle quantization scaling parameter of the category between the low quantization scaling parameter of the category and the high quantization scaling parameter of the category. In various implementations, the middle quantization scaling parameter is the mean of the low quantization scaling parameter and the high quantization scaling parameter. The device determines a middle threshold of the category between a low threshold of the category and a high threshold of the category and determines a bit rate of the spatial portion of the image at the middle quantization scaling parameter. The device selects the quantization scaling parameter for the spatial portion of the image based on a relation between the middle threshold of the category and the bit rate of the spatial portion of the image at the middle quantization scaling parameter. In various implementations, selecting the quantization scaling parameter for the spatial portion of the image includes selecting the middle quantization scaling parameter as the quantization scaling parameter of the spatial portion of the image.

The method 1000 continues, in block 1060, with the device quantizing the plurality of frequency coefficients according to the quantization matrix and the quantization scaling parameter for the spatial portion of the image to generate a plurality of quantized frequency coefficients.

The method 1000 continues, in block 1070, with the device transmitting the plurality of quantized frequency coefficients. In various implementations, transmitting the plurality of quantized frequency coefficients included encoding the quantized frequency coefficients (e.g., run-length encoding) and transmitting the encoded quantized frequency coefficients.

In various implementations, as noted above, the spatial portion of the image is a block of the image. In various such implementations, determining a category of the spatial portion of the image (in block 1040) includes determining a category of a slice including the block based on a relation between the plurality of thresholds and a bit rate of the slice at the plurality of quantization scaling parameters. Further, determining a quantization scaling parameter for the spatial portion of the image based the category (in block 1050) includes determining a quantization scaling parameter for the block of the image and at least one other block of the slice based on the category of the slice.

Figure 11:
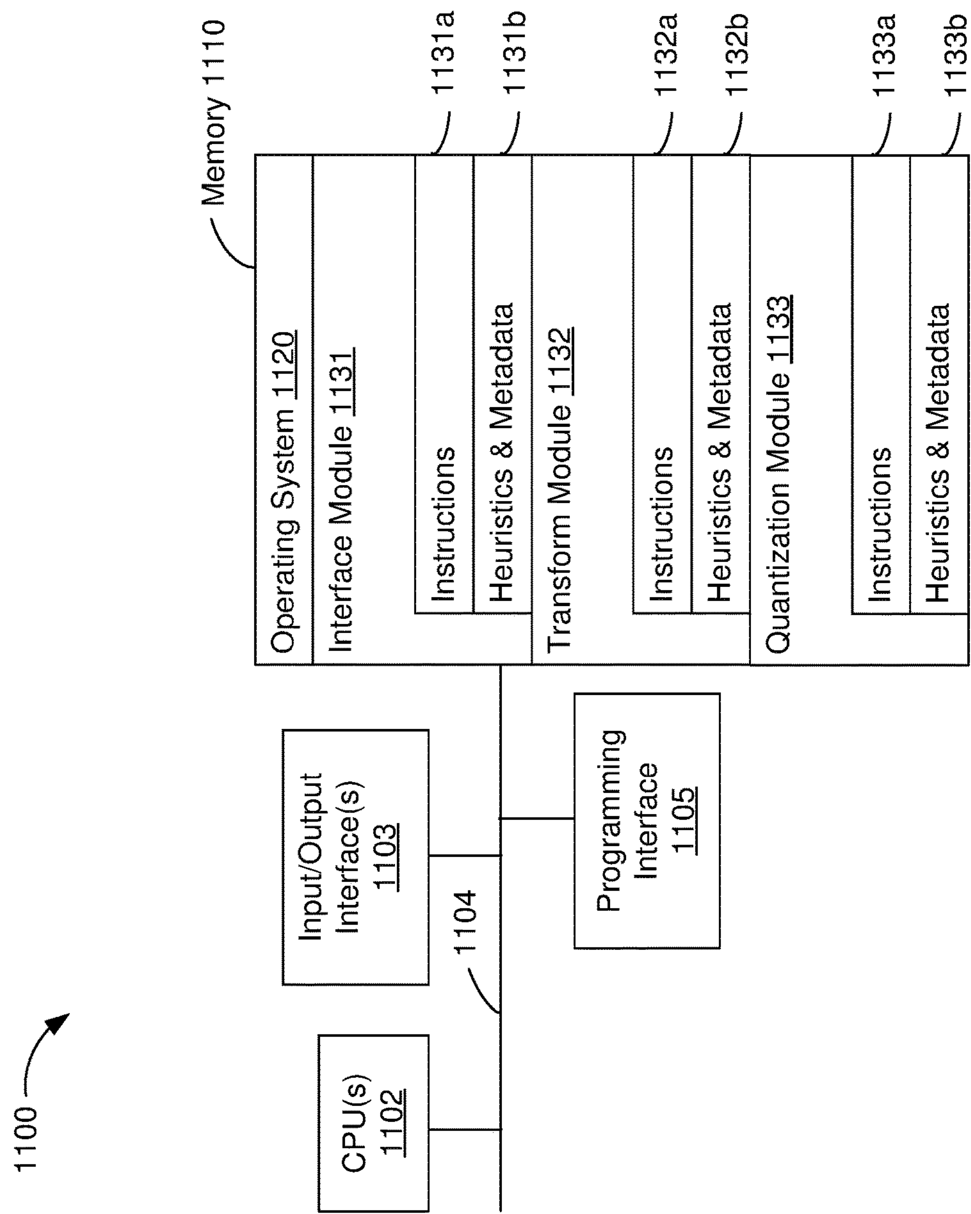
FIG. 11 is a block diagram of an example device in accordance with some implementations.

FIG. 11 is a block diagram of an example device 1100 in accordance with some embodiments. In some embodiments, the device corresponds to the video encoder 110 of FIG. 1 or portions thereof and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 1100 includes one or more processing units (CPU(s)) 1102 (e.g., processors), one or more input/output interfaces 1103 (e.g., a network interface), a memory 1110, a programming interface 1105, and one or more communication buses 1104 for interconnecting these and various other components.

In some embodiments, the communication buses 1104 include circuitry that interconnects and controls communications between system components. The memory 1110 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1110 optionally includes one or more storage devices remotely located from the CPU(s) 1102. The memory 1110 comprises a non-transitory computer readable storage medium. Moreover, in some embodiments, the memory 1110 or the non-transitory computer readable storage medium of the memory 1110 stores the following programs, modules and data structures, or a subset thereof including an optional operating system 1120, an interface module 1131, a transform module 1132, and a quantization module 1133. In some embodiments, one or more instructions are included in a combination of logic and non-transitory memory. The operating system 1120 includes procedures for handling various basic system services and for performing hardware dependent tasks.

In some embodiments, the interface module 1131 is configured to receive a first image comprising a plurality of pixels having a respective plurality of pixel locations and a respective plurality of pixel values. To that end, the interface module 1131 includes a set of instructions **1131*a* and heuristics and metadata 1131*b***.

In some embodiments, the transform module 1132 is configured to apply a frequency transform to a first spatial portion of the first image to generate a plurality of first frequency coefficients respectively associated with a plurality of spatial frequencies and to apply the frequency transform to a second spatial portion of the first image to generate a plurality of second frequency coefficients respectively associated with the plurality of spatial frequencies. To that end, the transform module 1132 includes a set of instructions **1132*a* and heuristics and metadata 1132*b***.

In some embodiments, the quantization module 1133 is configured to (1) obtain a first quantization matrix including, for each of the plurality of spatial frequencies, a respective first quantization parameter, wherein a first quantization parameter associated with a first spatial frequency of the plurality of spatial frequencies has a first ratio with a first quantization parameter associated with a second spatial frequency of the plurality of spatial frequencies, (2) obtain a second quantization matrix including, for each of the plurality of spatial frequencies, a respective second quantization parameter, wherein a second quantization parameter associated with the first spatial frequency has a second ratio, different than the first ratio, with a second quantization parameter associated with the second spatial frequency, (3) quantize the plurality of first frequency coefficients according to the first quantization matrix to generate a plurality of first quantized frequency coefficients, and (4) quantize the plurality of second frequency coefficients according to the second quantization matrix to generate a plurality of second quantized frequency coefficients. To that end, the quantization module 1133 includes a set of instructions **1133*a* and heuristics and metadata 1133*b***.

In some embodiments, the interface module 1131 is further configured to transmit the plurality of first quantized frequency coefficients and the plurality of second quantized frequency coefficients.

In some embodiments, the interface module 1131 is configured to receive an image comprising a plurality of pixels having a respective plurality of pixel locations and a respective plurality of pixel values. In some embodiments, the transform module 1132 is configured to apply a frequency transform to a spatial portion of the image to generate a plurality of frequency coefficients respectively associated with a plurality of spatial frequencies. In some embodiments, the quantization module 1133 is configured to obtain a quantization matrix including, for each of the plurality of spatial frequencies, a respective quantization parameter, wherein the quantization matrix is obtained based on a signal-to-noise ratio of the spatial portion, and quantize the plurality of frequency coefficients according to the quantization matrix to generate a plurality of quantized frequency coefficients. In some embodiments, the interface module 1131 is configured to transmit the plurality of quantized frequency coefficients.

In some embodiments, the interface module 1131 is configured to receive an image comprising a plurality of pixels having a respective plurality of pixel locations and a respective plurality of pixel values. In some embodiments, the transform module 1132 is configured to apply a frequency transform to a spatial portion of the image to generate a plurality of frequency coefficients respectively associated with a plurality of spatial frequencies. In some embodiments, the quantization module 1133 is configured to (1) obtain a quantization matrix including, for each of the plurality of spatial frequencies, a respective quantization parameter, (2) obtain a quantization spreading parameter defining a plurality of thresholds for a plurality of quantization scaling parameters, (3) determine a category of the spatial portion of the image based on a relation between the plurality of thresholds and a bit rate of the spatial portion of the image at the plurality of quantization scaling parameters, (4) determine a quantization scaling parameter for the spatial portion of the image based the category, and (5) quantize the plurality of frequency coefficients according to the quantization matrix and the quantization scaling parameter for the spatial portion of the image to generate a plurality of quantized frequency coefficients. In some embodiments, the interface module 1131 is configured to transmit the plurality of quantized frequency coefficients.

In some embodiments, the interface module 1131 is configured to receive an image comprising a plurality of pixels having respective plurality of pixel locations and a respective plurality of pixel values. In some embodiments, the transform module 1132 is configured to apply a frequency transform to a spatial portion of the image to generate a plurality of frequency coefficients respectively associated with a plurality of spatial frequencies. In some embodiments, the quantization module 1133 is configured to (1) determine a category of the spatial portion of the image based on a relation between a plurality of thresholds associated with a plurality of quantization scaling parameters and a bit rate of the spatial portion of the image at the plurality of quantization scaling parameters, (2) determine a quantization scaling parameter for the spatial portion of the image based the category, wherein the quantization scaling parameter for the spatial portion of the image is between a low quantization scaling parameter of the category and a high quantization scaling parameter of the category, and (3) quantize the plurality of frequency coefficients according to the quantization matrix and the quantization scaling parameter for the spatial portion of the image to generate a plurality of quantized frequency coefficients. In some embodiments, the interface module 1131 is configured to transmit the plurality of quantized frequency coefficients.

Although the interface module 1131, the transform module 1132, and the quantization module 1133 are illustrated as residing on a single device 1100, it should be understood that in other embodiments, any combination of the interface module 1131, the transform module 1132, and the quantization module 1133 can reside in separate devices. For example, in some embodiments, each of the interface module 1131, the transform module 1132, and the quantization module 1133 reside in a separate device.

Moreover, FIG. 11 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device including one or more processors and non-transitory memory:

receiving an image comprising a plurality of pixels having respective plurality of pixel locations and a respective plurality of pixel values;

applying a frequency transform to a spatial portion of the image to generate a plurality of frequency coefficients respectively associated with a plurality of spatial frequencies;

obtaining a quantization matrix including, for each of the plurality of spatial frequencies, a respective quantization parameter;

determining a category of the spatial portion of the image based on a relation between a plurality of thresholds associated with a plurality of quantization scaling parameters and a bit rate of the spatial portion of the image at the plurality of quantization scaling parameters;

determining a quantization scaling parameter for the spatial portion of the image based the category;

quantizing the plurality of frequency coefficients according to the quantization matrix and the quantization scaling parameter for the spatial portion of the image to generate a plurality of quantized frequency coefficients; and transmitting the plurality of quantized frequency coefficients.

2. The method of claim 1, wherein the plurality of thresholds are based on a target bit rate for the spatial portion of the image.

3. The method of claim 1, further comprising obtaining a quantization spreading parameter defining the plurality of thresholds associated with the plurality of quantization scaling parameters.

4. The method of claim 3, wherein the quantization spreading parameter defines a plurality of denominators and the plurality of thresholds are based on a target bit rate for the spatial portion of the image respectively divided by the plurality of denominators.

5. The method of claim 3, wherein, for a particular value of the quantization spreading parameter, the plurality of thresholds are equal.

6. The method of claim 1, wherein determining the category of the spatial portion of the image includes comparing the bit rate of the spatial portion of the image at each of the plurality of quantization scaling parameters to a corresponding threshold for each of the plurality of quantization scaling parameters.

7. The method of claim 6, wherein determining the category of the spatial portion of the image includes determining a lowest quantization scaling parameter of the plurality of quantization scaling parameters at which the bit rate of the spatial portion of the image is less than the corresponding threshold.

8. The method of claim 1, wherein determining the quantization scaling parameter for the spatial portion of the image based the category includes selecting a high quantization scaling parameter of the category.

9. The method of claim 1, wherein determining the quantization scaling parameter for the spatial portion of the image based on the category includes selecting a quantization scaling parameter between a low quantization scaling parameter of the category and a high quantization scaling parameter of the category.

10. The method of claim 9, wherein the quantization scaling parameter for the spatial portion of the image is a mean of the low quantization scaling parameter of the category and the high quantization scaling parameter of the category.

11. The method of claim 9, wherein determining the quantization scaling parameter for the spatial portion of the image comprises:

determining a middle quantization scaling parameter of the category between the low quantization scaling parameter of the category and the high quantization scaling parameter of the category;

determining a middle threshold of the category between a low threshold of the category and a high threshold of the category;

determining a bit rate of the spatial portion of the image at the middle quantization scaling parameter; and selecting the quantization scaling parameter for the spatial portion of the image based on a relation between the middle threshold of the category and the bit rate of the spatial portion of the image at the middle quantization scaling parameter.

12. The method of claim 11, wherein selecting the quantization scaling parameter for the spatial portion of the image includes selecting the middle quantization scaling parameter as the quantization scaling parameter of the spatial portion of the image.

13. The method of claim 1, further comprising determining the bit rate of the spatial portion of the image at the plurality of quantization scaling parameters, wherein determining the bit rate of the spatial portion of the image at the plurality of quantization scaling parameters comprises either, depending on at least one of a target bit rate of the spatial portion of the image, a signal-to-noise ratio of the spatial portion of the image, a complexity of the spatial portion of the image, or channel conditions of a channel over which the plurality of quantized frequency coefficients are transmitted, determining an estimated bit rate of the spatial portion of the image at the plurality of quantization scaling parameters or determining an actual bit rate of the spatial portion of the image at the plurality of quantization scaling parameters.

14. A device comprising:

non-transitory memory; and one or more processors to:

receive an image comprising a plurality of pixels having respective plurality of pixel locations and a respective plurality of pixel values;

apply a frequency transform to a spatial portion of the image to generate a plurality of frequency coefficients respectively associated with a plurality of spatial frequencies;

obtain a quantization matrix including, for each of the plurality of spatial frequencies, a respective quantization parameter;

determine a category of the spatial portion of the image based on a relation between a plurality of thresholds associated with a plurality of quantization scaling parameters and a bit rate of the spatial portion of the image at the plurality of quantization scaling parameters;

determine a quantization scaling parameter for the spatial portion of the image based the category;

quantize the plurality of frequency coefficients according to the quantization matrix and the quantization scaling parameter for the spatial portion of the image to generate a plurality of quantized frequency coefficients; and transmit the plurality of quantized frequency coefficients.

15. The device of claim 14, wherein the one or more processors are further to obtain a quantization spreading parameter defining the plurality of thresholds associated with the plurality of quantization scaling parameters.

16. The device of claim 15, wherein the quantization spreading parameter defines a plurality of denominators and the plurality of thresholds are based on a target bit rate for the spatial portion of the image respectively divided by the plurality of denominators.

17. The device of claim 15, wherein, for a particular value of the quantization spreading parameter, the plurality of thresholds are equal.

18. The device of claim 14, wherein the one or more processors are to determine the quantization scaling parameter for the spatial portion of the image based on the category by selecting a quantization scaling parameter between a low quantization scaling parameter of the category and a high quantization scaling parameter of the category.

19. The device of claim 18, wherein the one or more processors are to determine the quantization scaling parameter for the spatial portion of the image by:

determining a middle quantization scaling parameter of the category between the low quantization scaling parameter of the category and the high quantization scaling parameter of the category;

determining a middle threshold of the category between a low threshold of the category and a high threshold of the category;

determining a bit rate of the spatial portion of the image at the middle quantization scaling parameter; and selecting the quantization scaling parameter for the spatial portion of the image based on a relation between the middle threshold of the category and the bit rate of the spatial portion of the image at the middle quantization scaling parameter.

20. A non-transitory memory storing one or more programs, which, when executed by one or more processors of a device, cause the device to:

receive an image comprising a plurality of pixels having respective plurality of pixel locations and a respective plurality of pixel values;

apply a frequency transform to a spatial portion of the image to generate a plurality of frequency coefficients respectively associated with a plurality of spatial frequencies;

obtain a quantization matrix including, for each of the plurality of spatial frequencies, a respective quantization parameter;

determine a category of the spatial portion of the image based on a relation between a plurality of thresholds associated with a plurality of quantization scaling parameters and a bit rate of the spatial portion of the image at the plurality of quantization scaling parameters;

determine a quantization scaling parameter for the spatial portion of the image based the category;

quantize the plurality of frequency coefficients according to the quantization matrix and the quantization scaling parameter for the spatial portion of the image to generate a plurality of quantized frequency coefficients; and transmit the plurality of quantized frequency coefficients.

* * * * *